United States Patent
Salik

(10) Patent No.: US 12,343,624 B2
(45) Date of Patent: *Jul. 1, 2025

(54) MULTIPLAYER VIDEO GAMES WITH VIRTUAL CHARACTERS HAVING DYNAMICALLY MODIFIED FIELDS OF VIEW

(71) Applicant: Activision Publishing, Inc., Santa Monica, CA (US)

(72) Inventor: Omer Salik, Hermosa Beach, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 18/054,218

(22) Filed: Nov. 10, 2022

(65) Prior Publication Data

US 2023/0107385 A1 Apr. 6, 2023

Related U.S. Application Data

(63) Continuation of application No. 16/996,021, filed on Aug. 18, 2020, now Pat. No. 11,524,234.

(51) Int. Cl.
*A63F 13/52* (2014.01)
*A63F 13/58* (2014.01)

(52) U.S. Cl.
CPC .............. *A63F 13/52* (2014.09); *A63F 13/58* (2014.09)

(58) Field of Classification Search
CPC ....... A63F 13/52; A63F 13/58; A63F 13/2145
See application file for complete search history.

(56) References Cited

U.S. PATENT DOCUMENTS

| 4,461,301 A | 7/1984 | Ochs |
| 4,908,761 A | 3/1990 | Tai |

(Continued)

FOREIGN PATENT DOCUMENTS

| AU | 768367 | 3/2004 |
| AU | 2005215048 | 10/2011 |

(Continued)

OTHER PUBLICATIONS

K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.

(Continued)

*Primary Examiner* — Yingchuan Zhang
(74) *Attorney, Agent, or Firm* — Novel IP

(57) ABSTRACT

A multiplayer game implementing a method for generating a plurality of training virtual areas; generating at least one GUI to display a list of the plurality of training virtual areas; using the at least one GUI, enabling a player to choose one of the plurality of training virtual areas, wherein said one of the plurality of training virtual areas is associated with at least one attribute; allowing the player to navigate a virtual character to said one of the plurality of training virtual areas; monitoring an activity of the virtual character in said one of the plurality of training virtual areas; determining a value of the at least one attribute based on the monitored activity; and updating a first attributes profile of the virtual character to a second attributes profile based on the determined value of the at least one attribute.

20 Claims, 13 Drawing Sheets

(56) References Cited

U.S. PATENT DOCUMENTS

| | | |
|---|---|---|
| 5,031,089 A | 7/1991 | Liu |
| 5,058,180 A | 10/1991 | Khan |
| 5,365,360 A | 11/1994 | Torres |
| 5,371,673 A | 12/1994 | Fan |
| 5,432,934 A | 7/1995 | Levin |
| 5,442,569 A | 8/1995 | Osano |
| 5,493,692 A | 2/1996 | Theimer |
| 5,497,186 A | 3/1996 | Kawasaki |
| 5,530,796 A | 6/1996 | Wang |
| 5,539,883 A | 7/1996 | Allon |
| 5,561,736 A | 10/1996 | Moore |
| 5,563,946 A | 10/1996 | Cooper |
| 5,606,702 A | 2/1997 | Diel |
| 5,630,129 A | 5/1997 | Wheat |
| 5,685,775 A | 11/1997 | Bakoglu |
| 5,694,616 A | 12/1997 | Johnson |
| 5,706,507 A | 1/1998 | Schloss |
| 5,708,764 A | 1/1998 | Borrel |
| 5,726,883 A | 3/1998 | Levine |
| 5,736,985 A | 4/1998 | Lection |
| 5,736,990 A | 4/1998 | Barrus |
| 5,737,416 A | 4/1998 | Cooper |
| 5,745,113 A | 4/1998 | Jordan |
| 5,745,678 A | 4/1998 | Herzberg |
| 5,758,079 A | 5/1998 | Ludwig |
| 5,761,083 A | 6/1998 | Brown |
| 5,762,552 A | 6/1998 | Vuong |
| 5,768,511 A | 6/1998 | Galvin |
| 5,774,668 A | 6/1998 | Choquier |
| 5,793,365 A | 8/1998 | Tang |
| 5,825,877 A | 10/1998 | Dan |
| 5,828,839 A | 10/1998 | Moncreiff |
| 5,835,692 A | 11/1998 | Cragun |
| 5,860,137 A | 1/1999 | Raz |
| 5,877,763 A | 3/1999 | Berry |
| 5,878,233 A | 3/1999 | Schloss |
| 5,880,731 A | 3/1999 | Liles |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,920,692 A | 7/1999 | Nguyen |
| 5,920,848 A | 7/1999 | Schutzer |
| 5,923,324 A | 7/1999 | Berry |
| 5,926,100 A | 7/1999 | Escolar |
| 5,933,818 A | 8/1999 | Kasravi |
| 5,938,722 A | 8/1999 | Johnson |
| 5,958,014 A | 9/1999 | Cave |
| 5,969,724 A | 10/1999 | Berry |
| 5,977,979 A | 11/1999 | Clough |
| 5,983,003 A | 11/1999 | Lection |
| 5,990,887 A | 11/1999 | Redpath |
| 5,990,888 A | 11/1999 | Blades |
| 6,006,223 A | 12/1999 | Agrawal |
| 6,008,848 A | 12/1999 | Tiwari |
| 6,009,455 A | 12/1999 | Doyle |
| 6,012,096 A | 1/2000 | Link |
| 6,014,145 A | 1/2000 | Bardon |
| 6,018,734 A | 1/2000 | Zhang |
| 6,021,268 A | 2/2000 | Johnson |
| 6,021,496 A | 2/2000 | Dutcher |
| 6,023,729 A | 2/2000 | Samuel |
| 6,025,839 A | 2/2000 | Schell |
| 6,032,129 A | 2/2000 | Greef |
| 6,049,819 A | 4/2000 | Buckle |
| 6,058,266 A | 5/2000 | Megiddo |
| 6,059,842 A | 5/2000 | Dumarot |
| 6,061,722 A | 5/2000 | Lipa |
| 6,067,355 A | 5/2000 | Lim |
| 6,069,632 A | 5/2000 | Mullaly |
| 6,070,143 A | 5/2000 | Barney |
| 6,076,093 A | 6/2000 | Pickering |
| 6,081,270 A | 6/2000 | Berry |
| 6,081,271 A | 6/2000 | Bardon |
| 6,088,727 A | 7/2000 | Hosokawa |
| 6,088,732 A | 7/2000 | Smith |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,108,420 A | 8/2000 | Larose |
| 6,111,581 A | 8/2000 | Berry |
| 6,115,718 A | 9/2000 | Huberman |
| 6,134,588 A | 10/2000 | Guenthner |
| 6,138,128 A | 10/2000 | Perkowitz |
| 6,141,699 A | 10/2000 | Luzzi |
| 6,144,381 A | 11/2000 | Lection |
| 6,148,294 A | 11/2000 | Beyda |
| 6,148,328 A | 11/2000 | Cuomo |
| 6,157,953 A | 12/2000 | Chang |
| 6,177,932 B1 | 1/2001 | Galdes |
| 6,179,713 B1 | 1/2001 | James |
| 6,182,067 B1 | 1/2001 | Presnell |
| 6,185,614 B1 | 2/2001 | Cuomo |
| 6,195,657 B1 | 2/2001 | Rucker |
| 6,199,067 B1 | 3/2001 | Geller |
| 6,201,881 B1 | 3/2001 | Masuda |
| 6,212,494 B1 | 4/2001 | Boguraev |
| 6,212,548 B1 | 4/2001 | Desimone |
| 6,216,098 B1 | 4/2001 | Clancey |
| 6,222,551 B1 | 4/2001 | Schneider |
| 6,226,686 B1 | 5/2001 | Rothschild |
| 6,233,583 B1 | 5/2001 | Hoth |
| 6,249,779 B1 | 6/2001 | Hitt |
| 6,266,649 B1 | 7/2001 | Linden |
| 6,271,842 B1 | 8/2001 | Bardon |
| 6,271,843 B1 | 8/2001 | Lection |
| 6,275,820 B1 | 8/2001 | Navin-Chandra |
| 6,282,547 B1 | 8/2001 | Hirsch |
| 6,293,865 B1 | 9/2001 | Kelly |
| 6,301,609 B1 | 10/2001 | Aravamudan et al. |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,127 B1 | 12/2001 | Bieganski |
| 6,334,141 B1 | 12/2001 | Varma |
| 6,336,134 B1 | 1/2002 | Varma |
| 6,337,700 B1 | 1/2002 | Kinoe |
| 6,345,264 B1 | 2/2002 | Breese |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,360,254 B1 | 3/2002 | Linden |
| 6,363,174 B1 | 3/2002 | Lu |
| 6,370,560 B1 | 4/2002 | Robertazzi |
| 6,396,513 B1 | 5/2002 | Helfman |
| 6,411,312 B1 | 6/2002 | Sheppard |
| 6,418,424 B1 | 7/2002 | Hoffberg |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,463,078 B1 | 10/2002 | Engstrom |
| 6,466,550 B1 | 10/2002 | Foster |
| 6,469,712 B1 | 10/2002 | Hilpert, Jr. |
| 6,473,085 B1 | 10/2002 | Brock |
| 6,473,103 B1 | 10/2002 | Bailey |
| 6,473,597 B1 | 10/2002 | Johnson |
| 6,476,830 B1 | 11/2002 | Farmer |
| 6,499,053 B1 | 12/2002 | Marquette |
| 6,501,834 B1 | 12/2002 | Milewski |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,559,863 B1 | 5/2003 | Megiddo |

(56) References Cited

U.S. PATENT DOCUMENTS

| | | |
|---|---|---|
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,594,673 B1 | 7/2003 | Smith |
| 6,601,084 B1 | 7/2003 | Bhaskaran |
| 6,618,751 B1 | 9/2003 | Challenger |
| 6,640,230 B1 | 10/2003 | Alexander |
| 6,641,481 B1 | 11/2003 | Mai |
| 6,645,153 B2 | 11/2003 | Kroll |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,742,032 B1 | 5/2004 | Castellani |
| 6,765,596 B2 | 7/2004 | Lection |
| 6,781,607 B1 | 8/2004 | Benham |
| 6,801,930 B1 | 10/2004 | Dionne |
| 6,807,562 B1 | 10/2004 | Pennock |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,854,007 B1 | 2/2005 | Hammond |
| 6,886,026 B1 | 4/2005 | Hanson |
| 6,901,379 B1 | 5/2005 | Balter |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,031,473 B2 | 4/2006 | Morais |
| 7,050,868 B1 | 5/2006 | Graepel |
| 7,062,533 B2 | 6/2006 | Brown |
| 7,089,266 B2 | 8/2006 | Stolte |
| 7,124,071 B2 | 10/2006 | Rich |
| 7,124,164 B1 | 10/2006 | Chemtob |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 | 2/2007 | Viswanath |
| 7,192,352 B2 | 3/2007 | Walker |
| 7,209,137 B2 | 4/2007 | Brokenshire |
| 7,230,616 B2 | 6/2007 | Taubin |
| 7,240,093 B1 | 7/2007 | Danieli |
| 7,249,123 B2 | 7/2007 | Elder |
| 7,263,511 B2 | 8/2007 | Bodin |
| 7,278,108 B2 | 10/2007 | Duarte |
| 7,287,053 B2 | 10/2007 | Bodin |
| 7,292,870 B2 | 11/2007 | Heredia |
| 7,305,438 B2 | 12/2007 | Christensen |
| 7,308,476 B2 | 12/2007 | Mannaru |
| 7,314,411 B2 | 1/2008 | Lannert |
| 7,328,242 B1 | 2/2008 | McCarthy |
| 7,353,295 B1 | 4/2008 | Crow |
| 7,376,474 B2 | 5/2008 | Graepel |
| 7,383,307 B2 | 6/2008 | Kirkland |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,509,388 B2 | 3/2009 | Allen |
| 7,515,136 B1 | 4/2009 | Kanevsky |
| 7,525,964 B2 | 4/2009 | Astley |
| 7,527,191 B2 | 5/2009 | Takayama |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,596,596 B2 | 9/2009 | Chen |
| 7,614,955 B2 | 11/2009 | Farnham |
| 7,617,283 B2 | 11/2009 | Aaron |
| 7,640,587 B2 | 12/2009 | Fox |
| 7,667,701 B2 | 2/2010 | Leah |
| 7,677,970 B2 | 3/2010 | O'Kelley, II |
| 7,698,656 B2 | 4/2010 | Srivastava |
| 7,702,730 B2 | 4/2010 | Spataro |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,770,114 B2 | 8/2010 | Sriprakash |
| 7,773,087 B2 | 8/2010 | Fowler |
| 7,774,407 B2 | 8/2010 | Daly |
| 7,780,525 B2 | 8/2010 | Walker |
| 7,782,318 B2 | 8/2010 | Shearer |
| 7,792,263 B2 | 9/2010 | D'Amora et al. |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,844,673 B2 | 11/2010 | Bostick |
| 7,846,024 B2 | 12/2010 | Graepel |
| 7,847,799 B2 | 12/2010 | Taubin |
| 7,853,594 B2 | 12/2010 | Elder |
| 7,856,469 B2 | 12/2010 | Chen |
| 7,865,393 B2 | 1/2011 | Leason |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,955,171 B2 | 6/2011 | Jorasch |
| 7,970,837 B2 | 6/2011 | Lyle |
| 7,970,840 B2 | 6/2011 | Cannon |
| 7,985,132 B2 | 7/2011 | Walker |
| 7,985,138 B2 | 7/2011 | Acharya |
| 7,990,387 B2 | 8/2011 | Hamilton, II |
| 7,996,164 B2 | 8/2011 | Hamilton, II |
| 7,997,987 B2 | 8/2011 | Johnson |
| 8,001,161 B2 | 8/2011 | George |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |

(56) References Cited

U.S. PATENT DOCUMENTS

| | | |
|---|---|---|
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Gakuto |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D'Amora et al. |
| 8,310,497 B2 | 11/2012 | Comparan |
| 8,313,364 B2 | 11/2012 | Reynolds |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,489,925 B1 | 7/2013 | Antukh |
| 8,496,531 B2 | 7/2013 | Youm |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,696,465 B2 | 4/2014 | Gatto |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,795,887 B2 | 10/2017 | Lin |
| 9,808,722 B2 | 11/2017 | Kawachiya |
| 9,827,488 B2 | 11/2017 | Pearce |
| 9,942,013 B2 | 4/2018 | Malladi |
| 10,118,099 B2 | 11/2018 | Condrey |
| 10,402,731 B1 | 9/2019 | Cosic |
| 2001/0025253 A1 | 9/2001 | Heintz |
| 2001/0032240 A1 | 10/2001 | Malone |
| 2001/0049301 A1 | 12/2001 | Masuda |
| 2002/0002514 A1 | 1/2002 | Kamachi |
| 2002/0007319 A1 | 1/2002 | Yu |
| 2002/0026388 A1 | 2/2002 | Roebuck |
| 2002/0035480 A1 | 3/2002 | Gordon |
| 2002/0035593 A1 | 3/2002 | Salim |
| 2002/0043568 A1 | 4/2002 | Hess |
| 2002/0065870 A1 | 5/2002 | Baehr-Jones |
| 2002/0090995 A1 | 7/2002 | Haga |
| 2002/0095586 A1 | 7/2002 | Doyle |
| 2002/0096831 A1 | 7/2002 | Nakayama |
| 2002/0097856 A1 | 7/2002 | Wullert |
| 2002/0116466 A1 | 8/2002 | Trevithick |
| 2002/0124137 A1 | 9/2002 | Ulrich |
| 2002/0130904 A1 | 9/2002 | Becker |
| 2002/0135618 A1 | 9/2002 | Maes |
| 2002/0169665 A1 | 11/2002 | Hughes |
| 2002/0184373 A1 | 12/2002 | Maes |
| 2002/0184391 A1 | 12/2002 | Phillips |
| 2002/0188688 A1 | 12/2002 | Bice |
| 2003/0008712 A1 | 1/2003 | Poulin |
| 2003/0014297 A1 | 1/2003 | Kaufman |
| 2003/0032476 A1 | 2/2003 | Walker |
| 2003/0050977 A1 | 3/2003 | Puthenkulam |
| 2003/0055892 A1 | 3/2003 | Huitema |
| 2003/0056002 A1 | 3/2003 | Trethewey |
| 2003/0076353 A1 | 4/2003 | Blackstock |
| 2003/0101343 A1 | 5/2003 | Eaton |
| 2003/0112952 A1 | 6/2003 | Brown |
| 2003/0135621 A1 | 7/2003 | Romagnoli |
| 2003/0141977 A1 | 7/2003 | Brown |
| 2003/0145128 A1 | 7/2003 | Baird |
| 2003/0149675 A1 | 8/2003 | Ansari |
| 2003/0158827 A1 | 8/2003 | Ansari |
| 2003/0177187 A1 | 9/2003 | Levine |

(56) References Cited

U.S. PATENT DOCUMENTS

| | | |
|---|---|---|
| 2003/0195957 A1 | 10/2003 | Banginwar |
| 2003/0210265 A1 | 11/2003 | Haimberg |
| 2004/0014514 A1 | 1/2004 | Yacenda |
| 2004/0054667 A1 | 3/2004 | Kake |
| 2004/0059781 A1 | 3/2004 | Yoakum |
| 2004/0078432 A1 | 4/2004 | Manber |
| 2004/0078596 A1 | 4/2004 | Kent |
| 2004/0088303 A1 | 5/2004 | Elder |
| 2004/0097287 A1 | 5/2004 | Postrel |
| 2004/0103079 A1 | 5/2004 | Tokusho |
| 2004/0113756 A1 | 6/2004 | Mollenkopf |
| 2004/0127277 A1 | 7/2004 | Walker |
| 2004/0128181 A1 | 7/2004 | Zurko |
| 2004/0172339 A1 | 9/2004 | Snelgrove |
| 2004/0174392 A1 | 9/2004 | Bjoernsen |
| 2004/0186886 A1 | 9/2004 | Galli et al. |
| 2004/0205134 A1 | 10/2004 | Digate |
| 2004/0210627 A1 | 10/2004 | Kroening |
| 2004/0228291 A1 | 11/2004 | Huslak |
| 2004/0244006 A1 | 12/2004 | Kaufman |
| 2004/0260771 A1 | 12/2004 | Gusler et al. |
| 2005/0015571 A1 | 1/2005 | Kaufman |
| 2005/0021484 A1 | 1/2005 | Bodin |
| 2005/0027696 A1 | 2/2005 | Swaminathan |
| 2005/0043097 A1 | 2/2005 | March |
| 2005/0050137 A1 | 3/2005 | Bodin |
| 2005/0060368 A1 | 3/2005 | Wang |
| 2005/0071428 A1 | 3/2005 | Khakoo |
| 2005/0071462 A1 | 3/2005 | Bodin |
| 2005/0080859 A1 | 4/2005 | Lake |
| 2005/0085296 A1 | 4/2005 | Gelb |
| 2005/0091380 A1 | 4/2005 | Gonen |
| 2005/0097440 A1 | 5/2005 | Lusk |
| 2005/0113164 A1 | 5/2005 | Buecheler |
| 2005/0132009 A1 | 6/2005 | Solie |
| 2005/0138108 A1 | 6/2005 | Galvin |
| 2005/0149620 A1 | 7/2005 | Kirkland |
| 2005/0161878 A1 | 7/2005 | Nally |
| 2005/0165893 A1 | 7/2005 | Feinberg |
| 2005/0216346 A1 | 9/2005 | Kusumoto |
| 2005/0223075 A1 | 10/2005 | Swearingen et al. |
| 2005/0246711 A1 | 11/2005 | Berstis |
| 2005/0277472 A1 | 12/2005 | Gillan |
| 2006/0003305 A1 | 1/2006 | Kelmar |
| 2006/0004659 A1 | 1/2006 | Hutchison |
| 2006/0026253 A1 | 2/2006 | Kessen |
| 2006/0031322 A1 | 2/2006 | Kessen |
| 2006/0031326 A1 | 2/2006 | Ovenden |
| 2006/0036688 A1 | 2/2006 | McMahan |
| 2006/0080702 A1 | 4/2006 | Diez |
| 2006/0121990 A1 | 6/2006 | O'Kelley |
| 2006/0128460 A1 | 6/2006 | Muir |
| 2006/0129643 A1 | 6/2006 | Nielson |
| 2006/0155813 A1 | 7/2006 | Dietz et al. |
| 2006/0160589 A1 | 7/2006 | Okada |
| 2006/0161852 A1 | 7/2006 | Chen |
| 2006/0178968 A1 | 8/2006 | Jung |
| 2006/0184260 A1 | 8/2006 | Graepel |
| 2006/0190591 A1 | 8/2006 | Bobde |
| 2006/0252526 A1 | 11/2006 | Walker |
| 2006/0258463 A1 | 11/2006 | Cugno |
| 2007/0026934 A1 | 2/2007 | Herbrich |
| 2007/0066403 A1 | 3/2007 | Conkwright |
| 2007/0073582 A1 | 3/2007 | Jung |
| 2007/0087799 A1 | 4/2007 | Van Luchene |
| 2007/0106526 A1 | 5/2007 | Jung |
| 2007/0111789 A1 | 5/2007 | Van Deursen |
| 2007/0112624 A1 | 5/2007 | Jung |
| 2007/0112706 A1 | 5/2007 | Herbrich |
| 2007/0117623 A1 | 5/2007 | Nelson |
| 2007/0117636 A1 | 5/2007 | Takahashi |
| 2007/0130001 A1 | 6/2007 | Jung |
| 2007/0168444 A1 | 7/2007 | Chen |
| 2007/0168447 A1 | 7/2007 | Chen |
| 2007/0173323 A1 | 7/2007 | Johnson |
| 2007/0180040 A1 | 8/2007 | Etgen |
| 2007/0218997 A1 | 9/2007 | Cho |
| 2007/0260567 A1 | 11/2007 | Funge |
| 2007/0265718 A1 | 11/2007 | Graepel |
| 2007/0281285 A1 | 12/2007 | Jayaweera |
| 2007/0298867 A1 | 12/2007 | Huang |
| 2008/0019353 A1 | 1/2008 | Foote |
| 2008/0059304 A1 | 3/2008 | Kimsey |
| 2008/0064467 A1 | 3/2008 | Reiner |
| 2008/0113815 A1 | 5/2008 | Weingardt |
| 2008/0120558 A1 | 5/2008 | Nathan |
| 2008/0126350 A1 | 5/2008 | Shoemaker |
| 2008/0155019 A1 | 6/2008 | Wallace |
| 2008/0176655 A1 | 7/2008 | James |
| 2008/0207329 A1 | 8/2008 | Wallace |
| 2008/0214287 A1 | 9/2008 | Lutnick |
| 2008/0242420 A1 | 10/2008 | Graepel |
| 2008/0254893 A1 | 10/2008 | Patel |
| 2008/0268943 A1 | 10/2008 | Jacob |
| 2008/0270605 A1 | 10/2008 | Berstis |
| 2008/0270916 A1 | 10/2008 | Chen |
| 2008/0274805 A1* | 11/2008 | Ganz ................. G06N 3/006 463/29 |
| 2008/0301405 A1 | 12/2008 | Kaufman |
| 2009/0005172 A1 | 1/2009 | Shibahara |
| 2009/0075738 A1 | 3/2009 | Pearce |
| 2009/0088233 A1 | 4/2009 | O'Rourke |
| 2009/0113448 A1 | 4/2009 | Smith |
| 2009/0118006 A1 | 5/2009 | Kelly |
| 2009/0137320 A1 | 5/2009 | Kimura |
| 2009/0209335 A1 | 8/2009 | Pearce |
| 2009/0253494 A1 | 10/2009 | Fitch |
| 2009/0280909 A1 | 11/2009 | McEniry |
| 2009/0318223 A1 | 12/2009 | Langridge |
| 2009/0325711 A1 | 12/2009 | Bronstein |
| 2010/0131864 A1 | 5/2010 | Bokor |
| 2010/0169800 A1 | 7/2010 | Lance |
| 2010/0173701 A1 | 7/2010 | Van Luchene |
| 2010/0173713 A1 | 7/2010 | Van Luchene |
| 2010/0203963 A1 | 8/2010 | Allen |
| 2010/0267450 A1 | 10/2010 | McMain |
| 2010/0304839 A1 | 12/2010 | Johnson |
| 2010/0306672 A1 | 12/2010 | McEniry |
| 2010/0312995 A1 | 12/2010 | Sung |
| 2011/0092279 A1 | 4/2011 | Pilip |
| 2011/0131085 A1 | 6/2011 | Wey |
| 2011/0190063 A1 | 8/2011 | Kajii |
| 2011/0212762 A1 | 9/2011 | Ocko |
| 2012/0009997 A1 | 1/2012 | Youm |
| 2012/0010734 A1 | 1/2012 | Youm |
| 2012/0015736 A1 | 1/2012 | Vanbragt |
| 2012/0021823 A1 | 1/2012 | Youm |
| 2012/0021825 A1 | 1/2012 | Harp |
| 2012/0064968 A1 | 3/2012 | Youm |
| 2012/0094751 A1 | 4/2012 | Reynolds |
| 2012/0122552 A1 | 5/2012 | Youm |
| 2012/0190456 A1 | 7/2012 | Rogers |
| 2012/0315993 A1 | 12/2012 | Dumont |
| 2013/0225260 A1 | 8/2013 | Cudak |
| 2013/0252737 A1 | 9/2013 | Mescon |
| 2013/0260876 A1 | 10/2013 | Margalith |
| 2013/0266927 A1 | 10/2013 | Mann |
| 2013/0296046 A1 | 11/2013 | Mianji |
| 2014/0004955 A1 | 1/2014 | Nahari |
| 2014/0004960 A1 | 1/2014 | Soti |
| 2014/0011595 A1 | 1/2014 | Muller |
| 2014/0024445 A1 | 1/2014 | Aller |
| 2014/0162763 A1 | 6/2014 | Kim |
| 2014/0162781 A1 | 6/2014 | Butler |
| 2014/0274402 A1 | 9/2014 | Michel |
| 2014/0342808 A1 | 11/2014 | Chowdhary |
| 2014/0344725 A1 | 11/2014 | Bates |
| 2014/0349753 A1 | 11/2014 | Lmai |
| 2015/0031426 A1 | 1/2015 | Alloway |
| 2015/0038233 A1 | 2/2015 | Rom |
| 2015/0051000 A1 | 2/2015 | Henn |
| 2015/0310698 A1 | 10/2015 | Polis |
| 2016/0001181 A1 | 1/2016 | Marr |
| 2016/0001182 A1 | 1/2016 | Marr |

(56) References Cited

U.S. PATENT DOCUMENTS

| | | |
|---|---|---|
| 2016/0001186 A1 | 1/2016 | Marr |
| 2016/0005270 A1 | 1/2016 | Marr |
| 2016/0067611 A1 | 3/2016 | Ware |
| 2016/0067612 A1 | 3/2016 | Ntoulas |
| 2016/0166935 A1 | 6/2016 | Condrey |
| 2016/0191671 A1 | 6/2016 | Dawson |
| 2016/0296840 A1 | 10/2016 | Kaewell |
| 2017/0206797 A1 | 7/2017 | Solomon |
| 2017/0279719 A1 | 9/2017 | Faith |
| 2018/0169515 A1 | 6/2018 | Rice |
| 2018/0280806 A1 | 10/2018 | Otomo |
| 2018/0308473 A1 | 10/2018 | Scholar |
| 2019/0043239 A1 | 2/2019 | Goel |
| 2019/0081848 A1 | 3/2019 | Zou |
| 2019/0118078 A1 | 4/2019 | Li |
| 2019/0126150 A1 | 5/2019 | Tartaj |
| 2019/0160379 A1* | 5/2019 | Matsushita ............ A63F 13/58 |
| 2019/0164007 A1 | 5/2019 | Liu |
| 2019/0184286 A1 | 6/2019 | Du |
| 2019/0197402 A1 | 6/2019 | Kovács |
| 2019/0205727 A1 | 7/2019 | Lin |
| 2019/0295306 A1 | 9/2019 | Weston |
| 2019/0340419 A1 | 11/2019 | Milman |
| 2020/0122038 A1 | 4/2020 | Ebrahimi |
| 2020/0122040 A1 | 4/2020 | Juliani, Jr. |
| 2020/0145615 A1 | 5/2020 | Seko |
| 2020/0372400 A1 | 11/2020 | Carreira-Perpiñán |
| 2020/0401576 A1 | 12/2020 | Yerli |
| 2021/0118239 A1* | 4/2021 | Santesteban ........... G06N 3/044 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 1207694 A2 | 5/2002 |
| EP | 1209849 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H11191097 A | 4/1999 |
| JP | 11191097 | 7/1999 |
| JP | 3033956 B2 | 4/2000 |
| JP | 3124916 B2 | 1/2001 |
| JP | 2001119403 A | 4/2001 |
| JP | 3177221 B2 | 6/2001 |
| JP | 2001204973 A | 7/2001 |
| JP | 3199231 B2 | 8/2001 |
| JP | 2001230883 A | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 2004062539 A | 2/2004 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 | 8/2012 |
| JP | 5159375 B2 | 3/2013 |
| JP | 5352200 B2 | 11/2013 |
| JP | 5550720 B2 | 7/2014 |
| JP | 2015002839 A | 1/2015 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| WO | 0060444 A1 | 10/2000 |
| WO | 0062231 A1 | 10/2000 |
| WO | 0137162 A2 | 5/2001 |
| WO | 0201455 A2 | 1/2002 |
| WO | 0203645 A2 | 1/2002 |
| WO | 2002073457 | 9/2002 |
| WO | 20020087156 | 10/2002 |
| WO | 03044755 A1 | 5/2003 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

"Universally Unique Identifier", 2006 (http://en.wikipedia.org/wiki/UUID).

E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.

Roaming Virtual World Is a Real Trip; [Final Edition] Leslie Walker. The Washington Post. Washington, D.C.: Mar. 30, 2006.

Lee et al., "A Self-Adjusting Data Distribution Mechanism for Multidimensional Load Balancing in Multiprocessor-Based Database Systems," Information Systems vol. 19, No. 7, pp. 549-567, 1994.

Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI=http://doi.acm.org/10.1145/566500.566504.

"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297. Nov. 11, 2002.

Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.

(56) References Cited

OTHER PUBLICATIONS

IBM, Transcoding: Extending e-business to new environments, Britton et al., Sep. 22, 2000.

IBM developer Works, OptimalGrid—autonomic computing on the Grid, James H. Kaufman; Tobin J. Lehman; Glenn Deen; and John Thomas, Jun. 2003.

International Search Report as Published as WO2005/079538 in corresponding international application No. PCT/US2005/005550. Jul. 5, 2006.

Feldman, R. "Mining unstructured data". Tutorial notes for ACK SIGKDD 1999. ACM Press. 182-236.

Wang, Y. "Web Mining and Knowledge Discovery of Usage Patterns". CS748T Project (Part I) Feb. 2000.

Sack, W. "Conversation Map: a content-based Usenet newsgroup browser". Proceedings of the 2000 International Conference on Intelligent User Interfaces. ACM Press. 233-240.

Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.

Garton, L., C. Haythornthwaite, B. Wellman. "Studying on-line social networks in Doing Internet Research", Jun. 1997.

Ackerman, M.S., B. Starr. "Social activity indicators: interface components for CSCW systems". Proceedings of the 8th ACM Symposium on User Interface and Software Technology. ACM Press. 159-168, Nov. 14-17, 1995.

Qureshi, S. "Supporting electronic group processes: a social perspective". Proceedings of the 1995 ACM SIGCPR Conference on Supporting teams, groups, and learning inside the IS function. ACM Press. 24-34.

Wellman, B. "For a social network analysis of computer networks: a sociological perspective on collaborative work and virtual community". Proceedings of the 1996 conference on ACM SIGCPR/SIGMIS. 1-11.

Schwartz, M. F., D. C. M. Wood. "Discovering shared interests among people using graph analysis of global electronic mail traffic". Department of Computer Science, University of Colorado, Boulder CO. Oct. 1992.

Kautz, H., B. Selman, M. Shah.. "Referral Web: Combining Social Networks and Collaborative Filtering". Communications of the ACM, vol. 40, No. 3, Mar. 1997.

V. Stojanovic, "Virtual boutique-try clothes on-line", 5th International Conference on Telecommunications in Modern Satellite, Cable and Broadcasting Service. TELSIKS 2001. Proceedings of Papers (Cat. No. 01EX517), 2001, pt. 2, p. 802-3 vol. 2.

Y. Zhao et al., "A 3D virtual shopping mall that has the intelligent virtual purchasing guider and cooperative purchasing functionalities", CSCWD 2004—8th International Conference on Computer Supported Cooperative Work in Design—Proceedings, 2004, p. 381-385.

Hassen et al., "A Task-and Data-Parallel Programming Language Based on Shared Objects," ACM Transactions on Programming Languages and Systems, vol. 20, No. 6, Nov. 1998, pp. 1131-1170.

Ma et al., "A Scalable Parallel Cell-Projection Volume Rendering Algorithm for Three-Dimensional Unstructured Data", IEEE 1997, pp. 1-10.

Andert, "A Simulation of Dynamic Task Allocation in a Distributed Computer System," Proceedings of the 1987 Winter Simulation Conference, 1987, pp. 1-9.

Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.

\* cited by examiner

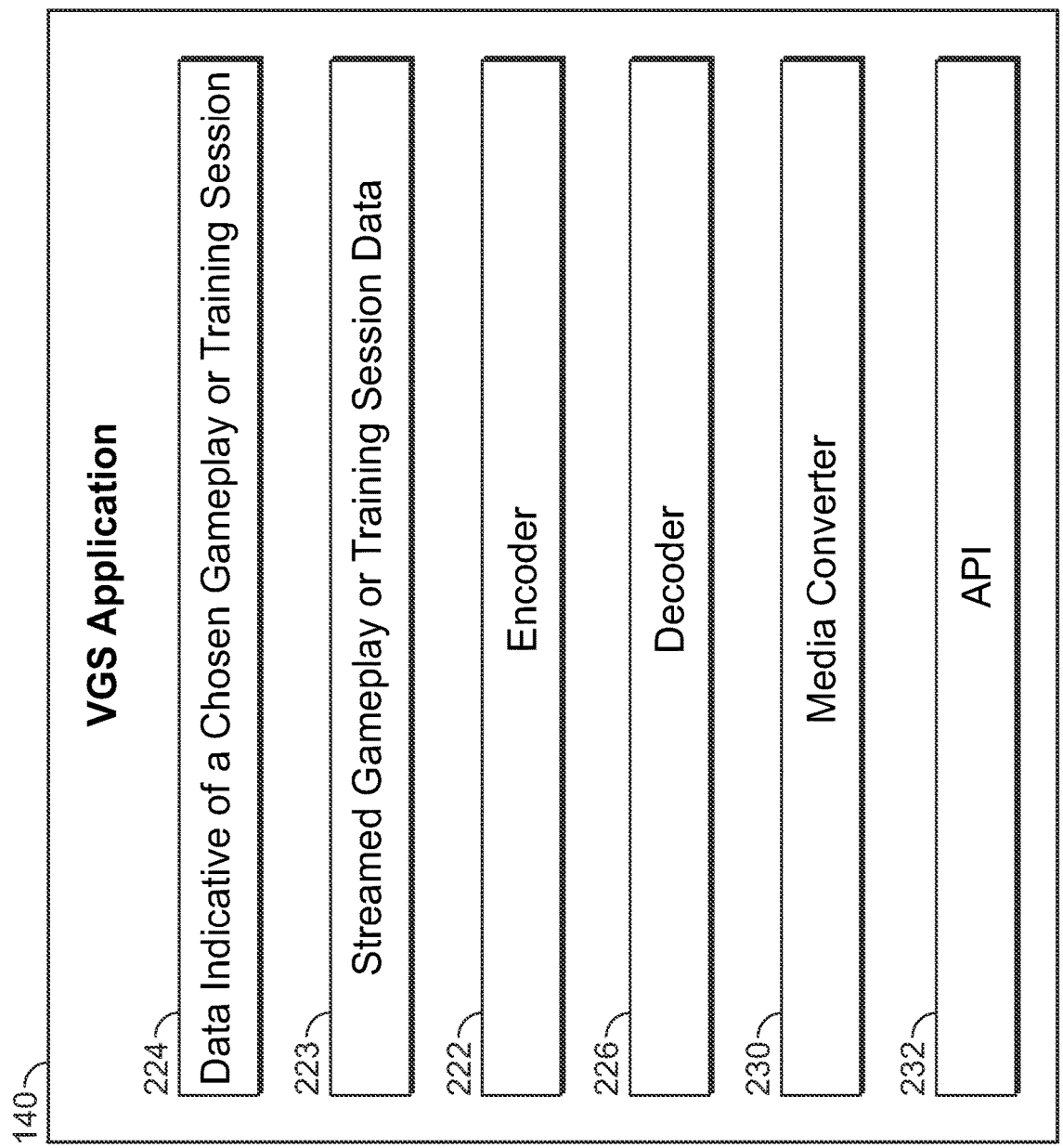

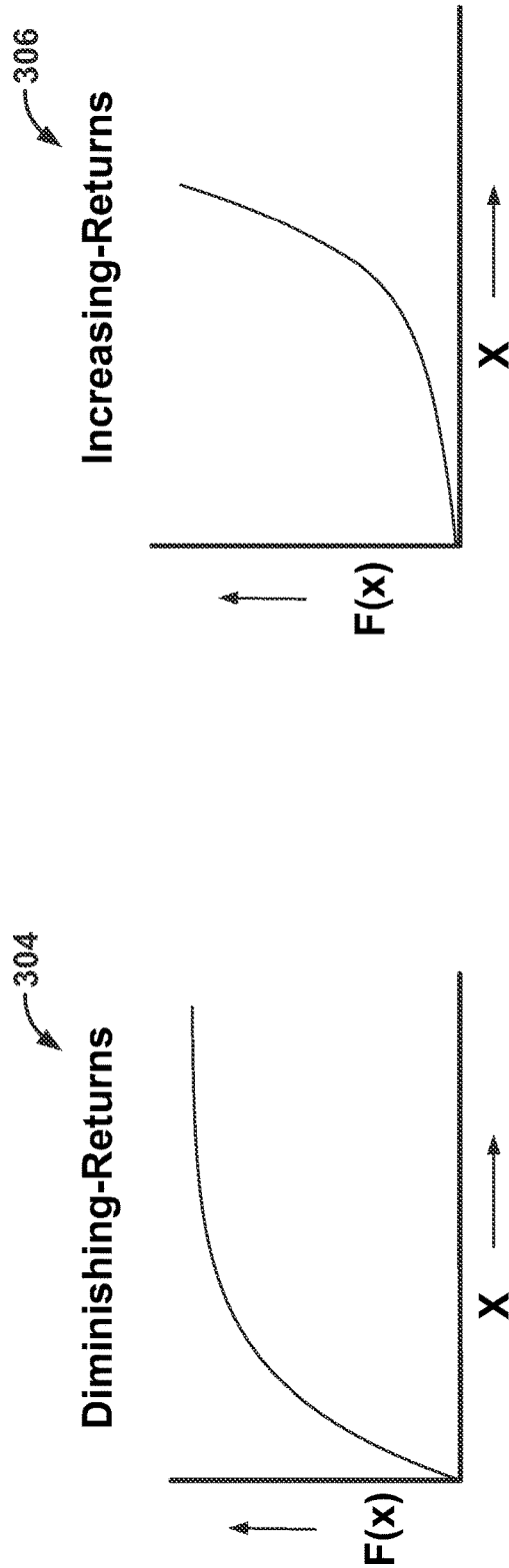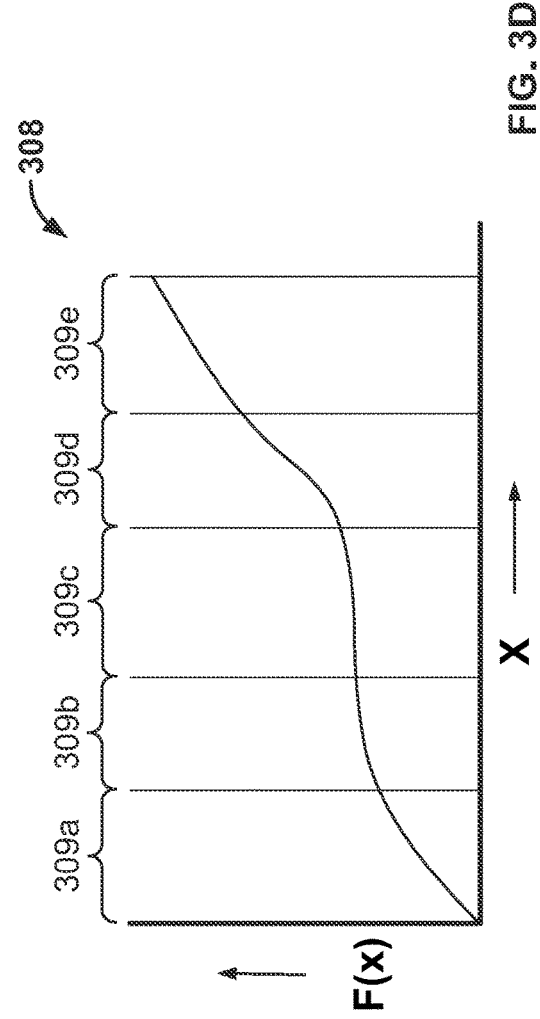

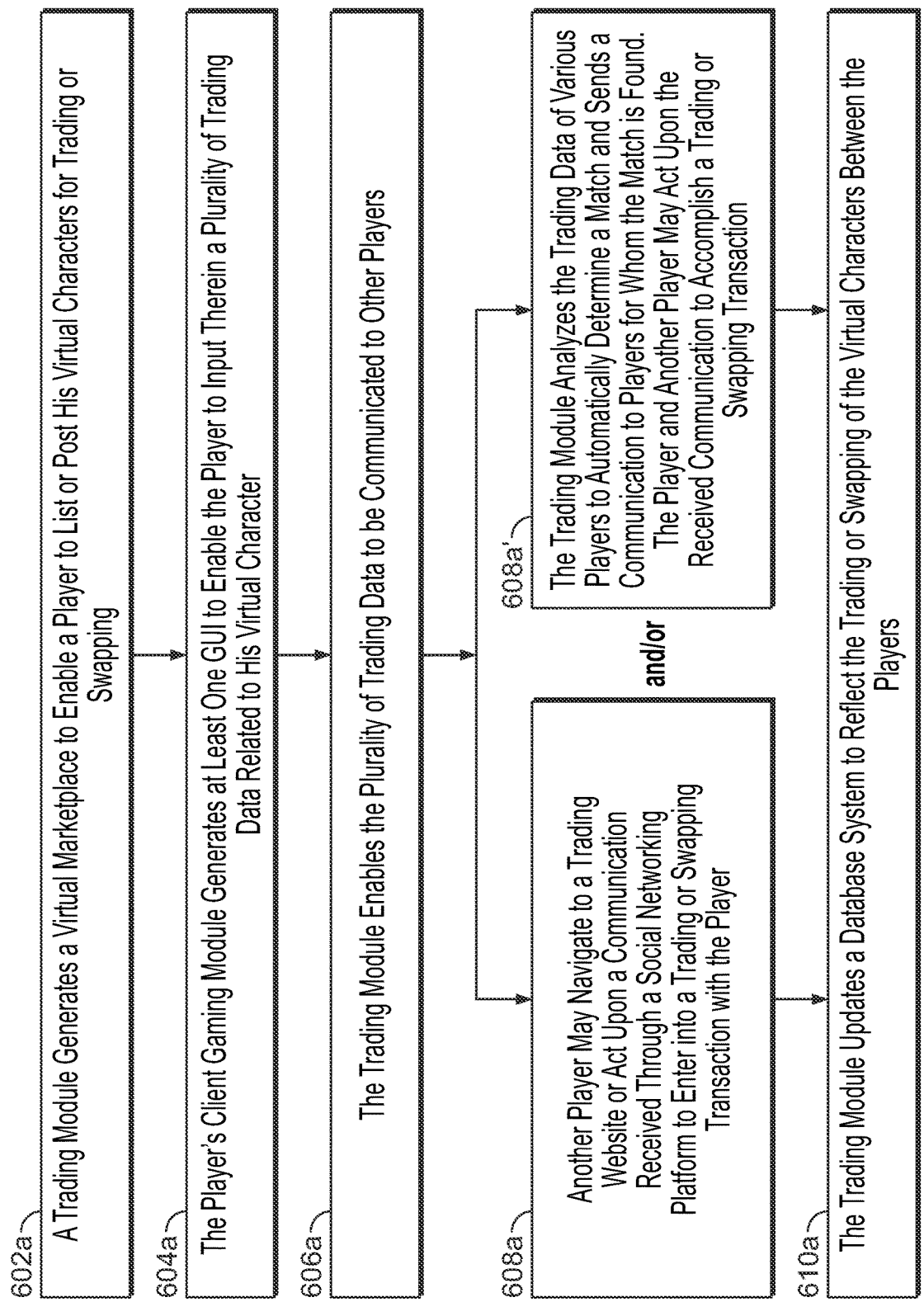

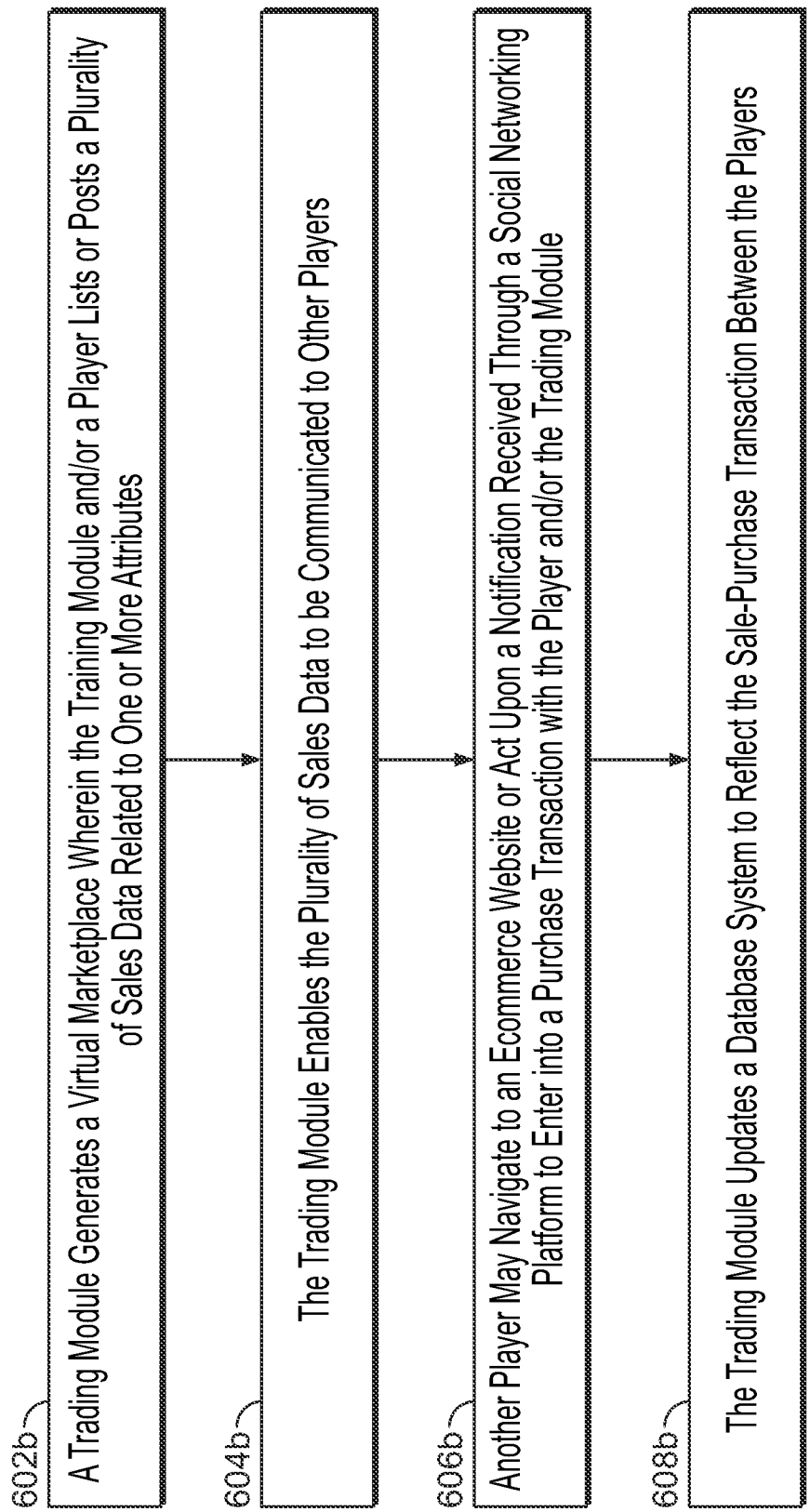

MULTIPLAYER VIDEO GAMES WITH VIRTUAL CHARACTERS HAVING DYNAMICALLY MODIFIED FIELDS OF VIEW

CROSS-REFERENCE

The present application is a continuation application of U.S. patent application Ser. No. 16/996,021, entitled "Multiplayer Video Games with Virtual Characters Having Dynamically Modified Fields of View" and filed on Aug. 18, 2020, which is herein incorporated by reference in its entirety.

FIELD

The present specification is related generally to the field of gaming. More specifically the present specification is related to multiplayer video games that empower players to evolve and/or acquire attributes for their virtual characters more dynamically and naturally, as opposed to predetermining the attributes and constraining their growth to discrete, predefined values or levels.

BACKGROUND

Multiplayer online gaming has seen explosive proliferation across the globe with numerous reliable and affordable broadband services allowing for a greater number of people to enjoy computer or video games of various genres. For example, in some computer games, players conquer territories or complete other missions for ever-increasing rewards. In many role-playing games (RPG) or first-person shooter (FPS) games, each player controls the actions of at least one virtual character or avatar. In addition, by controlling the actions of the virtual characters that players create during gameplay, the players (via their characters) accumulate various objects and/or abilities through extended play. The rules for how quickly, how many and what type of abilities and objects a virtual character may earn or gain usually involves several ratings or statistics. These ratings determine the outcome of various chance or future events that lead to new objects and abilities.

However, existing games, including e-sport competitive games, focus on predefined classes of virtual characters having predetermined attributes. The goal of these conventional games is to enable a game designer to balance the attributes of the game characters so as to allow for the skill level of the players to determine an outcome of the game.

Some conventional games, such as sports games, base their virtual characters on real life athletes, where the game characters attempt to copy the attributes of the real-life athlete. The shortcoming of these games is that it limits the characters to actual people and the attribute values or levels are predefined. For example, through gameplay, a player may be able to evolve his or her avatar from a "novice", which has pre-defined abilities, to an "intermediate", which also has pre-defined attributes, albeit improved over a "novice", to an "expert", which, again, has pre-defined attributes that are improved relative to both a novice and intermediate player. In all cases, however, the mix of attributes that a novice, intermediate, or expert avatar has are all fixed and within certain pre-defined ranges.

To enable avatars to become truly unique and reflective of the human players themselves, however, it is essential to create games where the attributes of the avatars, and the respective value ranges of those attributes, are not preset by a game developer and are authentic to, and fully controllable by, the players.

Accordingly, there is a need to enable players of computer games to select, focus on the development of, and/or improve attributes of their virtual characters in an open way, thereby encouraging the creation of unique game characters. There is also a need for a multi-player game where characters, with a unique set of attributes and value ranges, can be become celebrities in their own right. There is also a need for a multi-player game where such unique characters can compete in a multi-level competitive league, enabling human players to train "blank canvas" characters into competitive professionals. In sum, there is a need for the virtual characters to not be bounded by predefined attributes, roles and levels and, instead, unleash the creativity of players in order to empower them to create celebrity virtual characters, and there is a need to fully integrate an eSports ecosystem into a game's virtual environment so as to increase a player's level of immersion and thus realism of the game.

SUMMARY

The following embodiments and aspects thereof are described and illustrated in conjunction with systems, tools and methods, which are meant to be exemplary and illustrative, not limiting in scope. The present application discloses numerous embodiments.

In some embodiments, the present specification describes a method of enabling a virtual character of a player to evolve and/or acquire one or more attributes in a multiplayer game, said game being rendered on a multiplayer gaming network comprising at least one game server in data communication with a plurality of client devices located remote from each other, wherein the virtual character has an associated first attributes profile, the method comprising: generating a plurality of training virtual areas, said plurality of training virtual areas being integrated and navigable within a virtual environment of the game; generating at least one GUI to display a list of the plurality of training virtual areas; using the at least one GUI, enabling the player to choose one of the plurality of training virtual areas, wherein said one of the plurality of training virtual areas is associated with at least one attribute; allowing the player to navigate the virtual character to said one of the plurality of training virtual areas; monitoring an activity of the virtual character in said one of the plurality of training virtual areas; determining a value of the at least one attribute based on the monitored activity of the virtual character; and updating the first attributes profile to a second attributes profile based on the determined value of the at least one attribute.

Optionally, said first attributes profile comprises one or more base attributes and corresponding base values.

Optionally, the one or more base attributes enable the virtual character to be functional in a gaming session but are not enough to enable the virtual character to perform a competitive activity.

Optionally, the one or more base attributes are a subset of a universal set of a plurality of attributes associated with and relevant to the game.

Optionally, said activity of the virtual character is directed towards evolving at least one of the one or more base attributes and/or acquiring at least one attribute not included in the one or more base attributes.

Optionally, the one or more base attributes are chosen by the player.

Optionally, the one or more base attributes are randomly assigned to the virtual character.

Optionally, said value of the at least one attribute is determined using one of a learning function, a linear progression scale, an optimum scale or a sphere of influence.

Optionally, the second attributes profile comprises an updated base value of at least one of said one or more base attributes and/or addition of said at least one attribute with said value to said one or more base attributes.

In some embodiments, the present specification describes a system for enabling a virtual character of a player to evolve and/or acquire one or more attributes in a multiplayer game, said game being rendered on a multi-player gaming network comprising at least one game server in data communication with at least one database system and a plurality of client devices located remote from each other, wherein the virtual character has an associated first attributes profile stored in the database system, the system comprising: a training module in the at least one game server, configured to generate a plurality of training virtual areas, said plurality of training virtual areas being integrated and navigable within a virtual environment of the game; a game module stored locally in each of the plurality of client devices and configured to generate at least one GUI to display a list of the plurality of training virtual areas, wherein the player uses the at least one GUI to choose one of the plurality of training virtual areas, said one of the plurality of training virtual areas being associated with at least one attribute, wherein the training module allows the player to navigate the virtual character to said one of the plurality of training virtual areas, and wherein the training module monitors an activity of the virtual character in said one of the plurality of training virtual areas; and a profile module in the at least one game server, configured to receive data indicative of said activity of the virtual character in said one of the plurality of training virtual areas and determine a value of the at least one attribute based on the received data, wherein the profile module updates the first attributes profile to a second attributes profile based on the determined value of the at least one attribute.

Optionally, said first attributes profile comprises one or more base attributes and corresponding base values.

Optionally, the one or more base attributes enable the virtual character to be functional in a gaming session but are not enough to enable the virtual character to perform a competitive activity.

Optionally, the one or more base attributes are a subset of a universal set of a plurality of attributes associated with and relevant to the game.

Optionally, said activity of the virtual character is directed towards evolving at least one of the one or more base attributes and/or acquiring at least one attribute not included in the one or more base attributes.

Optionally, the one or more base attributes are chosen by the player.

Optionally, the one or more base attributes are randomly assigned to the virtual character.

Optionally, said value of the at least one attribute is determined using one of a learning function, a linear progression scale, an optimum scale or a sphere of influence system.

Optionally, the second attributes profile comprises an updated base value of at least one of said one or more base attributes and/or addition of said at least one attribute with said value to said one or more base attributes.

In some embodiments, the present specification describes a computer readable non-transitory medium comprising a plurality of executable programmatic instructions wherein, when said plurality of executable programmatic instructions are executed by a processor in a computing device, a process for enabling a virtual character of a player to evolve and/or acquire one or more attributes in a multiplayer game is performed, wherein the game is provided on a multi-player gaming network that comprises at least one game server and a plurality of client devices in data communication and located remote from each other, and wherein the virtual character has an associated first state, the plurality of executable programmatic instructions comprising: generating, using a training module in the at least one game server, a plurality of training virtual areas within a virtual environment of the game; generating, in a game module stored locally in each of the plurality of client devices, at least one GUI to display a list of the plurality of training virtual areas; enabling, using the at least one GUI, the player to choose one of the plurality of training virtual areas, wherein said one of the plurality of training virtual areas is associated with at least one attribute; allowing, using the training module, the player to navigate the virtual character to said one of the plurality of training virtual areas; monitoring, using the training module, an activity of the virtual character in said one of the plurality of training virtual areas; determining, in a profile module in the at least one game server, a value of the at least one attribute based on the monitored activity of the virtual character; and updating, using the profile module, the first state to a second state based on the determined value of the at least one attribute, wherein said first state comprises one or more base attributes and corresponding base values, and wherein said second state comprises an updated base value of at least one of said one or more base attributes and/or addition of said at least one attribute with said value to said one or more base attributes.

Optionally, said value of the at least one attribute is determined using one of a learning function, a linear progression scale, an optimum scale or a sphere of influence system.

In some embodiments, the present specification describes a computer-implemented method of providing gameplay to a player of a video game, the method being implemented by a computing device having one or more physical processors programmed with computer program instructions that, when executed by the one or more physical processors, cause the computing device to perform the method, the method comprising: providing a module to the player, wherein the module is configured to receive input from the player and wherein the module is configured to control a virtual character of the video game based on the input; retrieving a first attribute value associated with a first field of view of the virtual character; rendering a first virtual area, wherein the first virtual area is configured to enable the player to engage in gameplay with the first field of view; retrieving a second attribute value; updating the first attribute value to the second attribute value, wherein the second attribute value is associated with a second field of view of the virtual character; and rendering the first virtual area, wherein the first virtual area is configured to enable the player to engage in gameplay with the second field of view, wherein the second field of view is different from the first field of view.

Optionally, at least one of the first field of view or the second field of view is a first-person field of view.

Optionally, at least one of the first field of view or the second field of view is a third-person field of view.

Optionally, the first field of view is wider than the second field of view.

Optionally, the second field of view is wider than the first field of view.

Optionally, said updating of the first attribute value to the second attribute value is in response to a gameplay event.

Optionally, the gameplay event is at least one of: the player's completion of a training activity, the player's accumulation of a threshold amount of experience points, or the player's completion of a gameplay level.

Optionally, the first virtual area is an area for conducting gameplay relating to a sporting event.

Optionally, the method further comprises rendering a second virtual area to enable the player to engage in gameplay with the second field of view.

In some embodiments, the present specification describes a computer readable non-transitory medium comprising a plurality of executable programmatic instructions wherein, when said plurality of executable programmatic instructions are executed by a processor in a computing device, a process for providing gameplay to a player of a video game is performed, the plurality of executable programmatic instructions comprising: receiving data from the player; controlling a virtual character of the video game based on the data; retrieving a first attribute value associated with a first field of view of the virtual character; rendering a first virtual area configured to enable the player to engage in gameplay with the first field of view; retrieving a second attribute value; updating the first attribute value to the second attribute value, wherein the second attribute value is associated with a second field of view of the virtual character; and rendering the first virtual area configured to enable the player to engage in gameplay with the second field of view, wherein the second field of view is different from the first field of view.

Optionally, at least one of the first field of view or the second field of view is a first-person field of view.

Optionally, at least one of the first field of view or the second field of view is a third-person field of view.

Optionally, the first field of view is wider than the second field of view.

Optionally, the second field of view is wider than the first field of view.

Optionally, the updating of the first attribute to the second attribute value is in response to a gameplay event.

Optionally, the gameplay event is at least one of: the player's completion of a training activity, the player's accumulation of a threshold amount of experience points, or the player's completion of a gameplay level.

Optionally, the first virtual area is an area for conducting gameplay relating to a sporting event.

Optionally, the computer readable non-transitory medium further comprises rendering a second virtual area to enable the player to engage in gameplay with the second field of view.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein:

FIG. 2 depicts a block diagram of a video game stream (VGS) application, in accordance with some embodiments of the present specification;

FIG. 3B is an exemplary diminishing-returns learning curve, in accordance with some embodiments of the present specification;

FIG. 3C is an exemplary increasing-returns learning curve, in accordance with some embodiments of the present specification;

FIG. 3D is an exemplary complex learning curve, in accordance with some embodiments of the present specification;

FIG. 6A is a flowchart describing a plurality of exemplary steps of a method of enabling a player to trade or swap his virtual character with a virtual character of another player, in accordance with some embodiments of the present specification;

FIG. 6B is a flowchart describing a plurality of exemplary steps of a method of enabling a player to conduct in-game sale and/or purchase of one or more attributes of a virtual character associated with the player, in accordance with some embodiments of the present specification;

DETAILED DESCRIPTION

Figure 1:
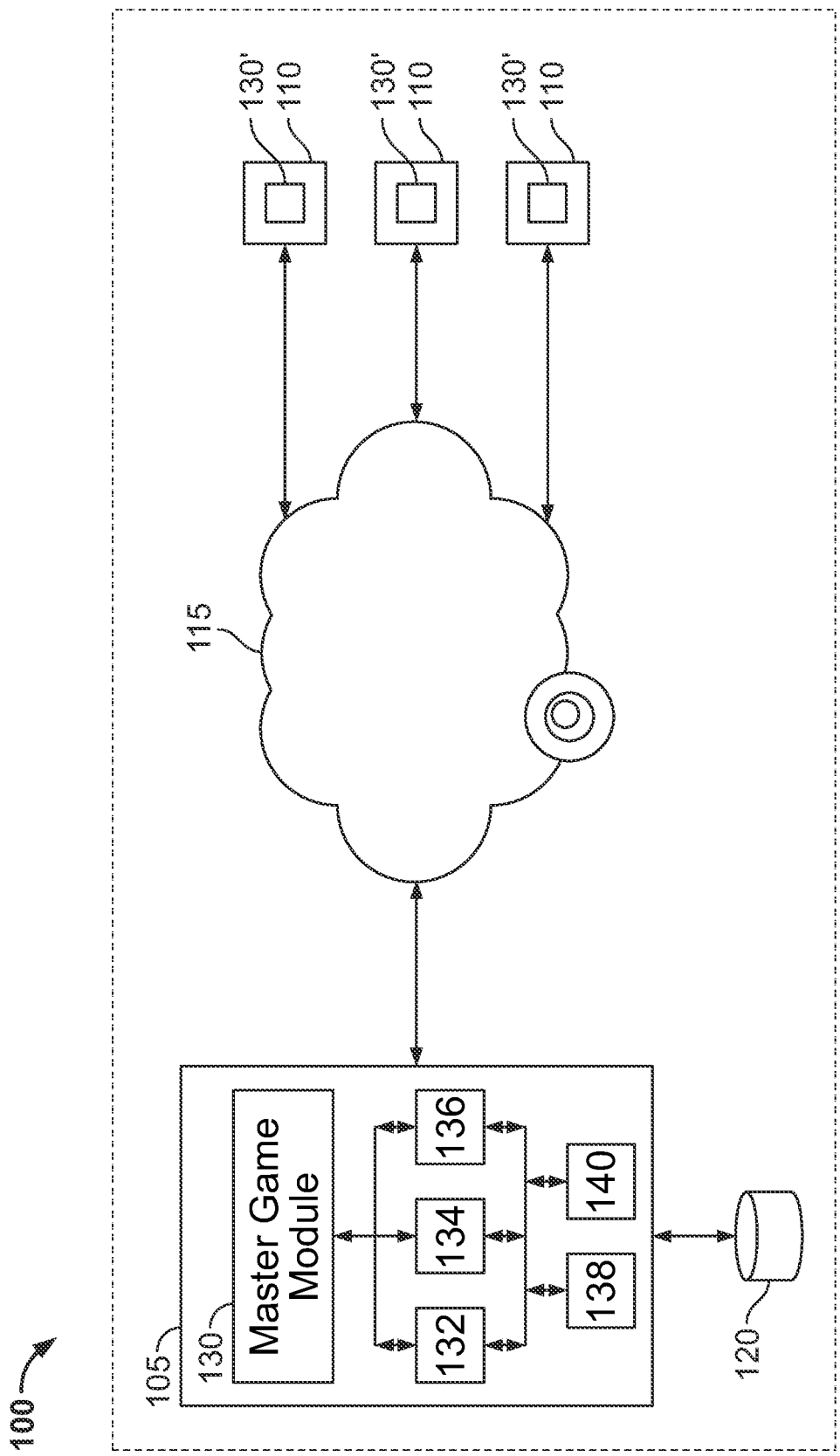
FIG. 1 is a block diagram illustrating a multi-player online gaming system or environment for enabling a player to evolve and/or acquire one or more attributes of his virtual character, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The term "a multi-player online gaming environment" or "massively multiplayer online game" may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multi-player gaming environment or massively multi-player online game is a computer-related technology, a non-generic technological environment, and should not be abstractly considered a generic method of organizing human activity divorced from its specific technology environment.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

The term "module", "application" or "engine" used in this disclosure may refer to computer logic utilized to provide a desired functionality, service or operation by programming or controlling a general purpose processor. Stated differently, in some embodiments, a module, application or engine implements a plurality of instructions or programmatic code to cause a general purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

The term "attribute" used in this disclosure refers to a trait, characteristic, skill, ability, feature or competence of a virtual character or avatar. An attribute enables a virtual character to participate and perform in competitive gameplay.

The term "attribute value" used in this disclosure refers to an extent, degree, intensity or level of an attribute possessed by a virtual character or avatar.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

Overview

FIG. 1 illustrates an embodiment of a multi-player online gaming or massively multiplayer online gaming system/environment 100 in which the systems and methods of the present specification may be implemented or executed. The system 100 comprises client-server architecture, where one or more game servers 105 are in communication with one or more client devices 110 over a network 115. Players and spectators may access the system 100 via the one or more client devices 110. The client devices 110 comprise computing devices such as, but not limited to, personal or desktop computers, laptops, Netbooks, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105 over the network 115.

The one or more game servers 105 can be any computing device having one or more processors and one or more computer-readable storage media such as RAM, hard disk or any other optical or magnetic media. The one or more game servers 105 include a plurality of modules operating to provide or implement a plurality of functional, operational or service-oriented methods of the present specification. In some embodiments, the one or more game servers 105 include or are in communication with at least one database system 120. The database system 120 stores a plurality of game data associated with at least one game that is served or provided to the client devices 110 over the network 115. In some embodiments, the one or more game servers 105 may be implemented by a cloud of computing platforms operating together as game servers 105.

In accordance with aspects of the present specification, the one or more game servers 105 provide or implement a plurality of modules or engines such as, but not limited to, a master game module 130, a virtual character (VC) profile module 132, a VC training module 134, an eSports module 136 and a trading module 138. In some embodiments, the one or more client devices 110 are configured to implement or execute one or more of a plurality of client-side modules that are same as or similar to the modules of the one or more game servers 105. For example, in some embodiments each of the client devices 110 executes a client-side game module 130' (also referred to as—client gaming module 130').

While various aspects of the present specification are being described with reference to functionalities or programming distributed across multiple modules or engines 132, 134, 136 and 138, it should be appreciated that, in some embodiments, some or all of the functionalities or programming associated with these modules or engines may be integrated within fewer modules or in a single module—such as, for example, in the master game module 130 itself.

In embodiments, the master game module 130 is configured to execute an instance of an online game to facilitate interaction of the players with the game. In embodiments, the instance of the game executed may be synchronous, asynchronous, and/or semi-synchronous. The master game module 130 controls aspects of the game for all players and receives and processes each player's input in the game. In other words, the master game module 130 hosts the online game for all players, receives game data from the client devices 110 and transmits updates to all client devices 110 based on the received game data so that the game, on each of the client devices 110, represents the most updated or current status with reference to interactions of all players with the game. Thus, the master game module 130 transmits game data over the network 115 to the client devices 110 for use by the game module 130' to provide local versions and current status of the game to the players.

On the client-side, each of the one or more client devices 110 implements the game module 130' that operates as a gaming application to provide a player with an interface between the player and the game. The game module 130' generates the interface to render a virtual environment, virtual space or virtual world associated with the game and enables the player to interact in the virtual environment to perform a plurality of game and other tasks and objectives. The game module 130' accesses game data received from the game server 105 to provide an accurate representation of the game to the player. The game module 130' captures and processes player inputs and interactions within the virtual world or environment and provides updates to the game server 110 over the network 115.

In embodiments, the interface provided by the game module 130' enables players as well as spectators to seamlessly interact within and navigate through a plurality of virtual training areas generated by the training module 134, a hierarchical structure of an eSports ecosystem generated by the eSports module 136 and a virtual trading platform generated by the trading module 138. In various embodiments, the plurality of virtual training areas, the hierarchical structure of the eSports ecosystem and the virtual trading platform are fully integrated and navigable within the virtual world or environment of the game.

In accordance with some aspects of the present specification, the database system 120 stores a plurality of data organized into one or more data structures or schemas such as, for example, database tables. In some embodiments, the plurality of data comprises, for example, a universal set of a plurality of attributes associated with and relevant to the game being rendered or provisioned for gameplay on the system 100, a method of attribute value computation associated with each attribute of the universal set of the plurality of attributes, one or more base attributes and corresponding base values, identification data (such as, but not limited to, login ID, password, unique ID, demographic information such as gender, age, and nationality) related to players and spectators who are registered for logging into the game for gameplay and spectating respectively, identification data (such as, but not limited to, unique ID, name, alias, gender, age, and nationality) related to one or more virtual characters or avatars associated with each of the players, a plurality of attributes and corresponding attribute values associated with the virtual character of each player, data related to a tier, league or tournament that each player is qualified, eligible and allowed to play or participate in, data related to each tier, league or tournament that each player is currently playing or participating in, data related to a plurality of virtual training areas, data indicative of one or more activities and one or more attributes associated with the plurality of virtual training areas, data indicative of one or more activities (including, for example, date and time stamped logs of activities) that a player engages in within one or more of the plurality of virtual training areas, data related to the virtual trading platform and data related to various transactions performed by a player using the virtual trading platform.

The database system 120 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database system 120 may comprise one or more such databases that reside in one or more physical devices and in one or more physical locations.

In some embodiments, the one or more game servers 105 further implement an optional video game stream (VGS) application or module 140 to enable streaming of live as well as pre-recorded gaming and/or training sessions to client devices 110 for spectating. The VGS application 140 may include various instructions that program the one or more game servers 105. However, it should be understood that a portion (or all) of VGS application 140 may, alternatively or additionally, program the client devices 110 to perform at least some of the functions of the VGS application 140. Accordingly, in some embodiments, the client gaming module 130' may additionally include the client-side component or functionalities of the VGS application 140 while a server-side component of the VGS application 140 may be implemented in the one or more game servers 105.

In embodiments, where the client gaming module 130' includes client-side programming and functionalities of the VGS application 140 a spectator may either choose to log into the game to navigate through the virtual environment (to spectate gameplay across a plurality of eSport tiers and activities of players in various virtual training areas) or may receive real-time or recorded video streams of gameplay across a chosen plurality of eSport tiers and activities of players in various virtual training areas. In some embodiments, one or more client devices 110 may include only the client-side programming of the VGS application 140 and not the client gaming module 130'. Such client devices 110 are therefore configured to only enable spectators (that is, non-players) to receive chosen real-time or pre-recorded video streams without allowing them to log-in as spectators and experience navigation through the virtual environment of the game.

FIG. 2 depicts a block diagram of a VGS application 140, according to an implementation of the present specification. The instructions of VGS application 140 may include, without limitation, a VGS encoder 222, data 224 indicative of a choice of gameplay or training session, streamed gameplay or training session data 223, a VGS decoder 226, a media converter 230, and an Application Programming Interface ("API") 232. As used herein, for convenience, the various instructions will be described as performing an operation, when, in fact, the various instructions program the one or more game servers 105 and the client devices 110. In embodiments, the data 224 identifies the gameplay or training session that a spectator has chosen to watch on his client device. The gameplay or training session data 223 refers to real-time or pre-recorded gameplay or training session being streamed to a spectator's client device.

In an implementation, VGS encoder 222 may obtain data 224, such as by the spectator interacting with the client gaming module on his client device, and utilize the data 224 to identify and request gameplay or training session data 223 from the master game module 130. VGS encoder 222 may also assign an identifier to the obtained data 224 and store the data 224 and its corresponding identifier in the database system 120. In an implementation, the VGS decoder 226 may obtain a VGS from the master game module 130 and decode the VGS to provide the requested gameplay or training session based on the data 224.

Media converter 230 may generate the visual and auditory display of the gameplay or training session (for example, using VGS decoder 226) and then convert the playback to a conventional gaming media format. Such conversion may occur via server-based processing using the one or more game servers 105, distributed processing using client devices 110, and/or cloud services processing techniques.

In an implementation, API 232 may provide access to the gameplay or training session data 223 to facilitate sharing of the data 223 with other spectators. For instance, a spectator may, through a client device 110, request to share a gameplay or training session being played or already played. API 232 may share the gameplay or training session data 223 with other spectators either via a social networking platform integrated and navigable within the virtual environment of the game or through an external social networking platform. Although described herein as relating to a video game or training session for convenience, the gameplay or training session data 223 may relate to a continuous game (for example, a virtual world simulation) that has no discrete ending. In these instances, the gameplay or training session data 223 may refer to a segment of time during a portion of the continuous game, as well as specific events in the course of the game.

Attributes of a Virtual Character

In various embodiments, the universal set of the plurality of attributes as well as the one or more base attributes are those types or categories of attributes, skills, traits, competencies or features that have a potential to affect gameplay when assigned to or acquired by a virtual character. In some embodiments, attributes that do not have a competitive bearing, influence or effect on gameplay may be allowed to be fully customized by a player (without any constraints or caveats) at the beginning of gameplay or any time during gameplay. For example, a player may be allowed to customize cosmetic and/or demographic attributes including attributes such as, but not limited to, appearance, gender, ethnicity, nationality, costume, age, race, religion or other similar aspects.

In various embodiments, the types and number of attributes depend on the genre, specific purpose or objective and imagination and design choices of a designer of a game. As an example, in a game simulating Olympic sports, the attributes of a virtual character can be those related to sporting competitions such as, but not limited to, height, weight, wingspan, speed, agility, strength, balance, stamina, jumping ability, throwing ability, vision, hand dexterity, mental perseverance, archery accuracy, running endurance, rifle/pistol shooting accuracy, rowing abilities, horse riding abilities, boxing abilities, wrestling abilities, swimming abilities, martial arts abilities, and diving abilities.

Following is a set of exemplary, non-exhaustive attributes related to genres such as, for example, action-adventure games, fighting games, RPGs (Role Playing Games), shooter games, and fantasy games: Field of view, ability to run faster in a quick burst, dodge incoming attacks, deflect arrows, blend or camouflage into a surrounding, weapons skills such as single-handed weapon use (such as, for example, swords, axes, clubs and pistols), dual-handed weapons use (such as, for example, rifles), weapon specializations, shooting skills, hand-to-hand combat, restorative abilities (restore a virtual character's health during a fight), armor strength to minimize damage intake, tactical strike capability (for example, to activate tactical strike a virtual character may aim at a target which will call in a powerful sir strike on in target), help-on-call (acquiring this attribute may enable a virtual character to call assistance-say, a creature who may aid the virtual character for a predefined period of time), heavy destruction capability (that may cause destruction in a large radius around the virtual character), attack accuracy, attacking capability (that is, the amount of physical or magical damage dealt in combat), resistance to magical damage in combat, luck (determines the likelihood of a virtual character landing a critical hit such that negative luck on a target increases the luck of the attacker), vigor or vitality (determines the amount of physical or magical damage a virtual character can withstand before it is impaired or critically wounded), espionage, ability to cast different types of magical spells, brew a potion, cast fireballs.

Initial or First State of a Virtual Character

In accordance with aspects of the present specification, a core part of the game is enabling a player to develop his virtual character or avatar from an initial, base, preliminary, starting or first state or attributes profile (hereinafter referred to as 'first state') into a second state or attributes profile on a continuum of evolved, developed, advanced and/or specialized states without influence or predetermined limits from the developers of the game. In embodiments, a first state of a virtual character is determined or established at the time a player creates and first launches the virtual character after logging into the game and before the player can participate in any gaming session. In embodiments, the first state of a virtual character is associated with one or more initial, base, preliminary or starting attributes (hereinafter referred to as 'base attributes') having corresponding initial, base, preliminary or starting values or points (hereinafter referred to as 'base values'). In some embodiments, the one or more base attributes are a subset of the universal set of the plurality of attributes associated with the game. In embodiments, the one or more base attributes and the corresponding base values enable the virtual character to be functional (in a gaming session or gameplay) but are not enough to enable the virtual character to perform a competitive activity or be substantially competitive vis-à-vis other players' virtual characters.

Out of the universal set of the plurality of attributes associated with and relevant to the game the base attributes may include, for example, strength, balance, speed and field of view. Each of the base attributes may have respective base values that correspond to strength, balance speed and field of view just enough to enable a virtual character to, say, walk in a virtual environment of the game. In one example, initially, the virtual character controlled by a player may have a base field of view—such as a first-person limited peripheral vision.

Figure 4A:
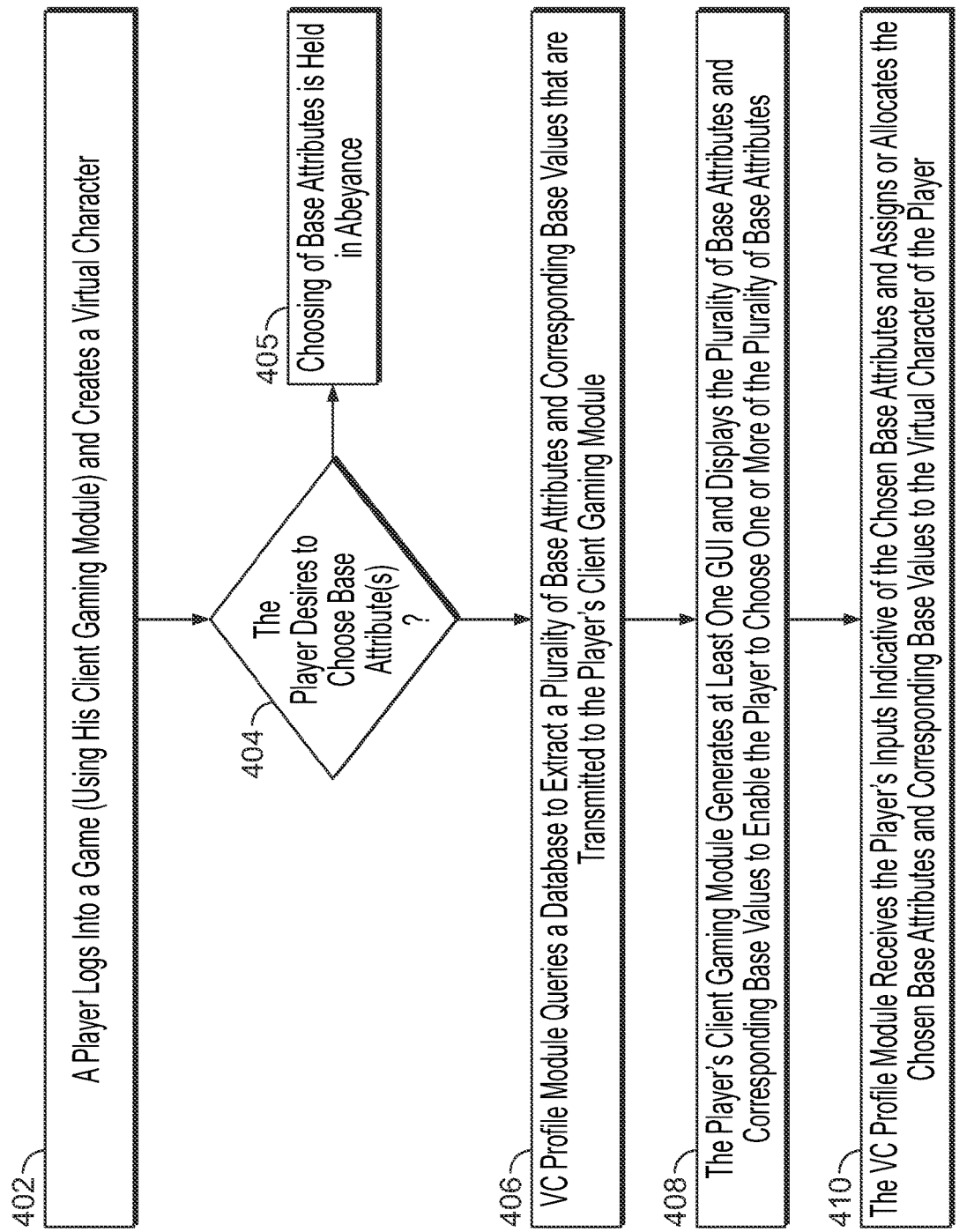
FIG. 4A is a flowchart describing a plurality of exemplary steps of a first method of associating one or more of a plurality of base attributes and corresponding base values to a virtual character, in accordance with some embodiments of the present specification.

In some embodiments, the module 132, in data communication with a player's client gaming module 130', implements a first method to associate or allocate one or more of a plurality of base attributes and corresponding base values to a virtual character. FIG. 4A is a flowchart of a plurality of steps of the first method, in accordance with some embodiments of the present specification. At step 402, a player logs into a game (using his client gaming module 130') and creates a virtual character. At step 404, in some embodiments, the module 132 proactively generates a prompt on the player's client gaming module 130' to check if he would like to choose and assign one or more of a plurality of base attributes and corresponding base values to his virtual character. If the player indicates that he would like to assign base attributes to his virtual character, the method flow progresses to step 406. If not, then at step 405, the task of allocating base attributes to the virtual character is held in abeyance for completion at a later time but before the player can participate in any gaming session. In alternate embodiments, the player may simply activate (such as, by clicking) a virtual icon or button on his client gaming module 130' to convey a desire to assign base attributes to his virtual character.

Consequently, at step 406, the module 132 queries the database 120 to extract the plurality of base attributes and corresponding base values that are transmitted to the player's client gaming module 130'. At step 408, the player's client gaming module 130' generates at least one GUI (Graphical User Interface) and displays the plurality of base attributes and corresponding base values to enable the player to choose one or more of the plurality of base attributes. In various embodiments, the player's client gaming module 130' implements at least one predefined rule to enable the player to choose one or more of the plurality of base attributes.

In some embodiments, the at least one predefined rule may require the player to choose at least 'k' and up to 'n' number of the plurality of base attributes. In some embodiments, 'k'=1, 2, 3 or any other number up to half of 'n' (that is, $1 \leq k \leq n/2$) where 'n' is an even number and up to $\frac{1}{3}^{rd}$ of 'n' (that is, $1 \leq k \leq n/3$) where 'n' is an odd number. In some embodiments, 'n' may be a number less than the total number of the plurality of base attributes. In some embodiments, 'n' may be equal to the total number of the plurality of base attributes. Thus, different players may choose different number of base attributes ranging from 'k' to 'n'. In some embodiments, the at least one predefined rule may allow the player to choose a number of base attributes ranging from 'k' to 'n' with a constraint or caveat that the final choice must necessarily include 'p' specific base attributes where 'p' is any number less than 'k'.

In some embodiments, the at least one predefined rule may require the player to choose a fixed number 'n' of the total number of the plurality of base attributes. In some embodiments, 'n' may be a number less than the total number of the plurality of base attributes. In some embodiments, the at least one predefined rule may require the player to choose a fixed number 'n' of the total number of the plurality of base attributes with a constraint or caveat that the chosen fixed number 'n' must necessarily include 'p' specific base attributes. In some embodiments, 'n' may be a number less than the total number of the plurality of base attributes while 'p' ranges from 1 to any other number up to half of 'n' (that is, $1 \leq p \leq n/2$) where 'n' is an even number and up to $\frac{1}{3}^{rd}$ of 'n' (that is, $1 \leq p \leq n/3$) where 'n' is an odd number. Thus, all players would choose the same number of base attributes however different players may end up with different combinations of these same number of base attributes.

In some embodiments, a base value displayed corresponding to a base attribute may be indicative or descriptive of the functionality, competence or skill assigned to the base attribute. For example, a base attribute of 'strength' may have a corresponding base value of 'walking', a base attribute of 'shooting' may have a corresponding base value of '10% accurate shot from a distance to target of 1 meter', and a base attribute of 'field of view' may have a corresponding base value of 'first-person limited peripheral vision'. In some embodiments, there may not be any base values displayed for the base attributes and the player may be challenged to realize and ascertain the base competence of his virtual character upon first game play.

At step 410, the module 132 receives the player's inputs indicative of the chosen base attributes and assigns or allocates the chosen base attributes and corresponding base values to the virtual character of the player. Consequently, the player's virtual character has an associated first state or attributes profile that is stored, by the module 132, in the database system 120.

Figure 4B:
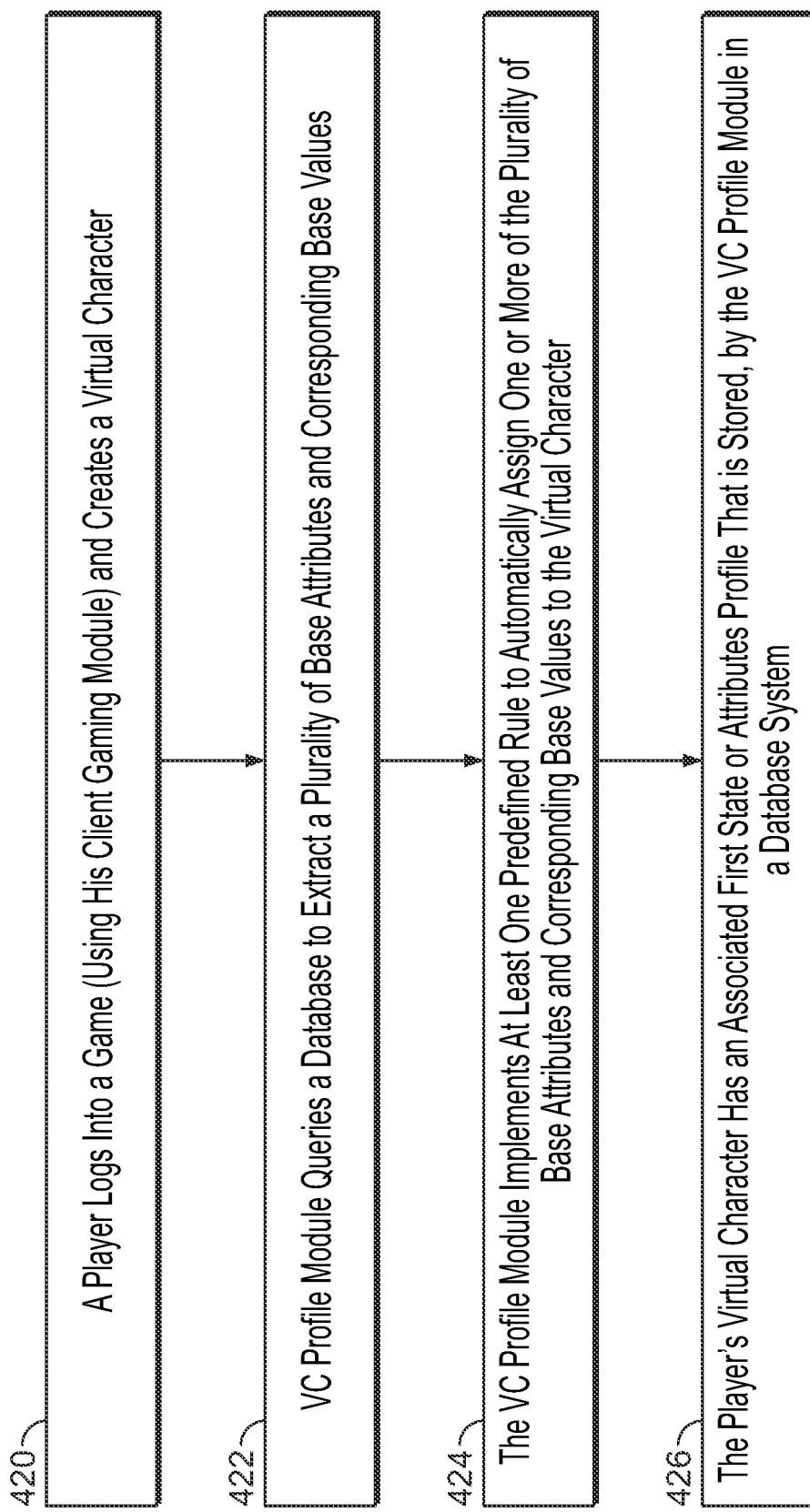
FIG. 4B is a flowchart describing a plurality of exemplary steps of a second method of associating one or more of a plurality of base attributes and corresponding base values to a virtual character, in accordance with some embodiments of the present specification.

In some embodiments, the module 132 implements a second method to associate or allocate one or more of a plurality of base attributes and corresponding base values to a virtual character. FIG. 4B is a flowchart of a plurality of steps of the second method, in accordance with some embodiments of the present specification. At step 420, a player logs into a game (using his client gaming module 130') and creates a virtual character.

At step 422, the module 132 queries the database 120 to extract a plurality of base attributes and corresponding base values. At step 424, the module 132 implements at least one predefined rule to automatically (that is, without any influence or interference from the player) assign one or more of the plurality of base attributes and corresponding base values to the virtual character.

In some embodiments, the at least one rule may enable the module 132 to randomly assign any 'm' number of the plurality of base attributes to the virtual character. In some embodiments, 'm' ranges from one to a number equal to the total number of the plurality of base attributes. In one example, where the plurality of base attributes are, say, four—that is, strength, balance, speed and field of view and 'm'=3, the module 132 may randomly assign any three out of the four base attributes to the virtual character.

In some embodiments, the at least one rule may enable the module 132 to randomly assign 'm' number of the plurality of base attributes to the virtual character with a constraint or caveat that the randomly chosen 'm' base attributes must necessarily include at least 'q' specific base attributes. In some embodiments, 'm' ranges from one to a number equal to the total number of the plurality of base attributes. In some embodiments, 'q' ranges from 1 to any other number up to half of 'm' (that is, $1 \leq q \leq m/2$) where 'm' is an even number and up to $\frac{1}{3}$rd of 'm' (that is, $1 \leq q \leq m/3$) where 'm' is an odd number. In one example, where the plurality of base attributes are, say, four—that is, strength, balance, speed and field of view and 'm'=3 a caveat may require that the randomly chosen three base attributes must necessarily include q=1 base attribute of the field of view. In another example, where the plurality of base attributes are, say, five—that is, height, strength, balance, speed and field of view and 'm'=4 a caveat may require that the randomly chosen four base attributes must necessarily include q=2 base attributes of strength and field of view.

It should be appreciated that the at least one rule of random allocation of base attributes mimics a process of DNA combination where a predefined number of the plurality of base attributes are randomly chosen through permutation and combination.

In some embodiments, the at least one rule may enable the module 132 to assign or allocate a fixed number 'm' of the same base attributes from the total number of the plurality of base attributes. Thus, all players will have exactly same number and types of base attributes (with corresponding base values)—that is, the first state (or the starting attributes profile) of the virtual characters is the same for all players.

Consequently, at step 426, the player's virtual character has an associated first state or attributes profile that is stored, by the module 132, in the database system 120.

Figure 4C:
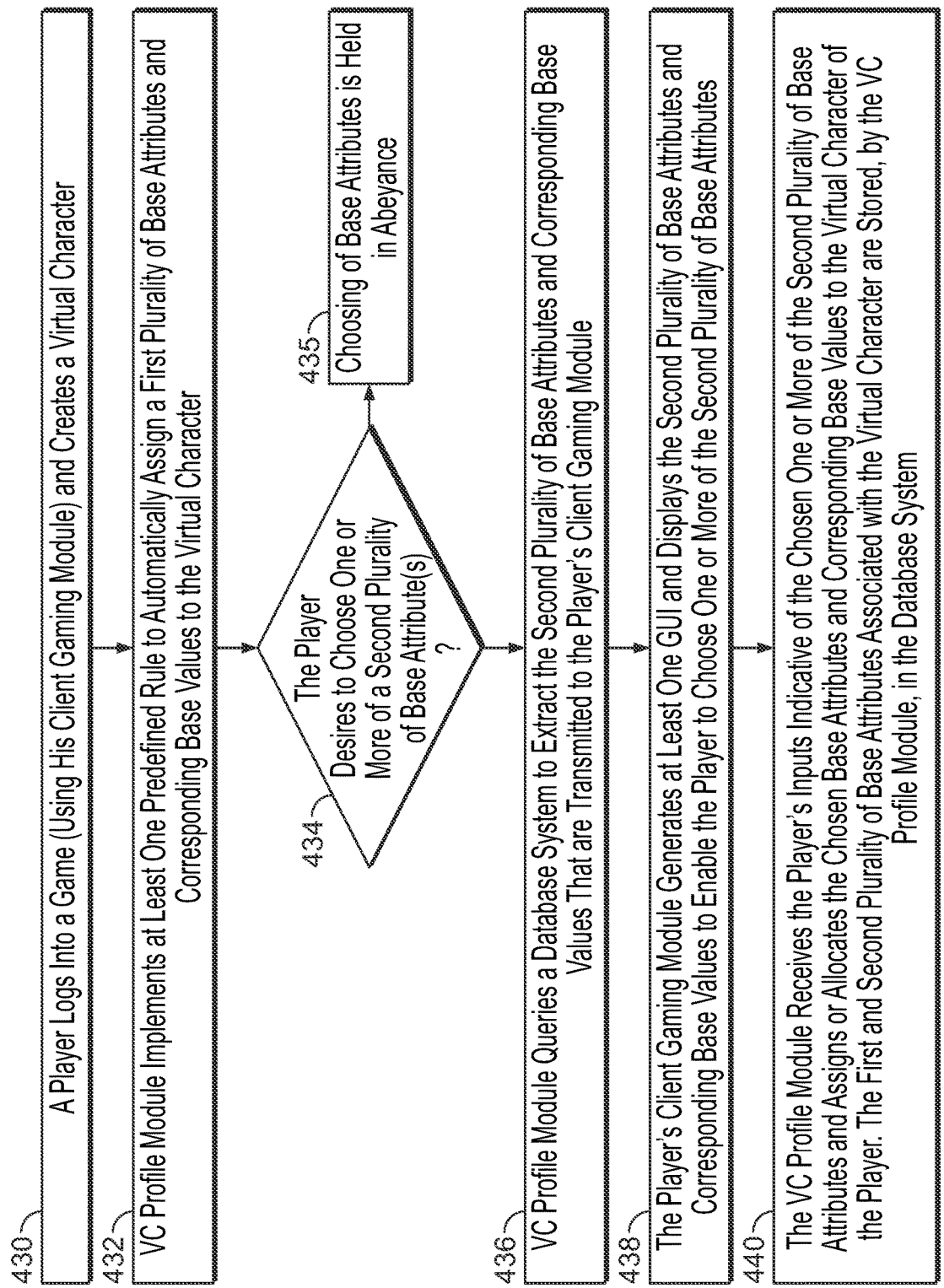
FIG. 4C is a flowchart describing a plurality of exemplary steps of a third method of associating one or more of a plurality of base attributes and corresponding base values to a virtual character, in accordance with some embodiments of the present specification.

In some embodiments, the module 132, in data communication with a player's client gaming module 130', implements a third method to associate or allocate one or more of a plurality of base attributes and corresponding base values to a virtual character. The third method is a combination or hybrid of the first and second methods of FIGS. 4A, 4B. FIG. 4C is a flowchart of a plurality of steps of the third method, in accordance with some embodiments of the present specification. At step 430, a player logs into a game (using his client gaming module 130') and creates a virtual character. At step 432, the module 132 implements at least one predefined rule, described with reference to the step 422 of FIG. 4B, to automatically (that is, without any influence or interference from the player) assign a first plurality of base attributes and corresponding base values to the virtual character. The module 132 may generate a prompt or feedback on the player's client gaming module 130' to inform the player that the first plurality of base attributes have been assigned to the virtual character.

At step 434, the module 132 proactively generates a prompt on the player's client gaming module 130' to check if he would like to choose and assign one or more of a second plurality of base attributes and corresponding base values to his virtual character. If the player indicates that he would like to choose the second plurality of base attributes, the method flow progresses to step 436. If not, then at step 435, the task of allocating the second plurality of base attributes to the virtual character is held in abeyance for completion at a later time but before the player can participate in any gaming session.

At step 436, the module 132 queries the database 120 to extract the second plurality of base attributes and corresponding base values that are transmitted to the player's client gaming module 130'. At step 438, the player's client gaming module 130' generates at least one GUI (Graphical User Interface) and displays the second plurality of base attributes and corresponding base values to enable the player to choose one or more of the second plurality of base attributes. In various embodiments, the player's client gaming module 130' implements at least one predefined rule, described with reference to the step 406 of FIG. 4A, to enable the player to choose one or more of the second plurality of base attributes.

In some embodiments, the total of number of first and second plurality of base attributes is equal to the total number of the plurality of base attributes available for allocation or assigning to the virtual character.

At step 440, the module 132 receives the player's inputs indicative of the chosen one or more of the second plurality of base attributes and assigns or allocates the chosen one or more of the second plurality of base attributes and corresponding base values to the virtual character of the player.

Consequently, the player's virtual character has an associated first state (or attributes profile) comprising of the first and second plurality of base attributes wherein the first plurality of base attributes are automatically assigned by the module 132 while the second plurality of base attributes are chosen by the player. The first and second plurality of base attributes associated with the virtual character are stored, by the module 132, in the database system 132.

In accordance with some aspects of the present specification, the module 132 is configured to ensure that all players have substantially level field of play in terms of the first state (of their virtual characters) generated by implementing each of the first, second and third methods. In situations where players are allowed to choose base attributes and/or the base attributes are randomly assigned or allocated, the base attributes and the corresponding base values are such that all permutation and combination of base attributes result in substantially similar overall first state (that is, base competence or attributes profile) of the virtual characters of all players. In other words, none of the virtual characters are at a substantial advantage or disadvantage relative to each other in their respective initial or first states. Also, the base attributes and the corresponding base values enable the virtual characters to be functional but are not enough to enable the virtual characters to perform anything substantially competitive during gameplay.

Second State of a Virtual Character

In accordance with aspects of the present specification, the VC profile module 132 is configured to enable a player to evolve or develop attributes of his virtual character naturally from a first state (or first attributes profile) to a second state (or second attributes profile), as opposed to a virtual character whose growth is constrained to discrete, predefined buckets. For example, rather than a virtual character increasing its strength attribute from level 1 to level 2 to level 3 to level 4 and so on, in discrete value ranges and in association with predefined in-game actions, accomplishments and/or tasks, a player is empowered to evolve the strength attribute of his virtual character to a second state in an open-ended way and along a continuum of progression and learning, with (in some embodiments) no actual maximum cap on the attribute value.

The module 132 enables a player to have a class-less virtual character and allows the player to openly improve and upgrade his avatar's abilities and attributes through training and/or progression through challenges in gameplay. A motivation for this is to make the virtual characters/ avatars stars in their own right as opposed to the players controlling them. Accordingly, the game of the present specification enables virtual characters to mimic real life where they can be totally unique in their skills and attributes without predetermined limits. Thus, it means that there are no predefined virtual character classes like guards, centers, forwards in a basketball game; or mages, knights, elves in a fantasy game that would have certain predisposed abilities or attributes. All virtual characters, upon creation, are blank slates having respective first states or attributes profiles with one or more base attributes and corresponding base values. These first states do not differ substantially from one virtual character to another and enable the virtual characters to be just functional without imparting abilities to perform anything competitive.

In embodiments, the module 132 is configured to enable a player to grow an attributes, competencies or skills profile of his virtual character from a first state to a second state, wherein the second state is a more evolved, developed, advanced, optimized and/or specialized state compared to the first state (or attributes profile). In various embodiments, the second state is indicative of an attributes profile of a virtual character relative to an attributes profile of a state existing immediately prior to the second state. In some embodiments, the state existing immediately prior to the second state may constitute one or more base attributes. However, in other embodiments, the state existing immediately prior to the second state may comprise base attributes evolved to a certain degree and/or one or more attributes added (via acquiring) to the base attributes.

Also, in embodiments, the second state of a virtual character is not just a combination of attributes all of which are characterized by having corresponding attribute or skill values that are fixed and discrete with predefined range or limits based on predefined actions, accomplishments and/or tasks in gameplay. Instead, the second state is a variable and dynamic state which at any point is a composite or amalgamation of a plurality of attributes developed and/or acquired by the virtual character (out of the universal set of the plurality of attributes) wherein the plurality of attributes have corresponding attribute or skill values determined based on a continuum of effort, experience or learning. For example, a virtual character of the present specification can swim with widely varying degrees of ability, from not at all to completely competent as opposed to conventional games where the virtual character can either swim or cannot swim. In another example, a virtual character of the present specification may gradually develop or evolve weapons use attribute in terms of increase in damage infliction capability and accuracy, critical hit percentages, weapon recovery time, parrying capability, and resistance to being disarmed.

Methods of Attribute Value Computation

Figure 3A:
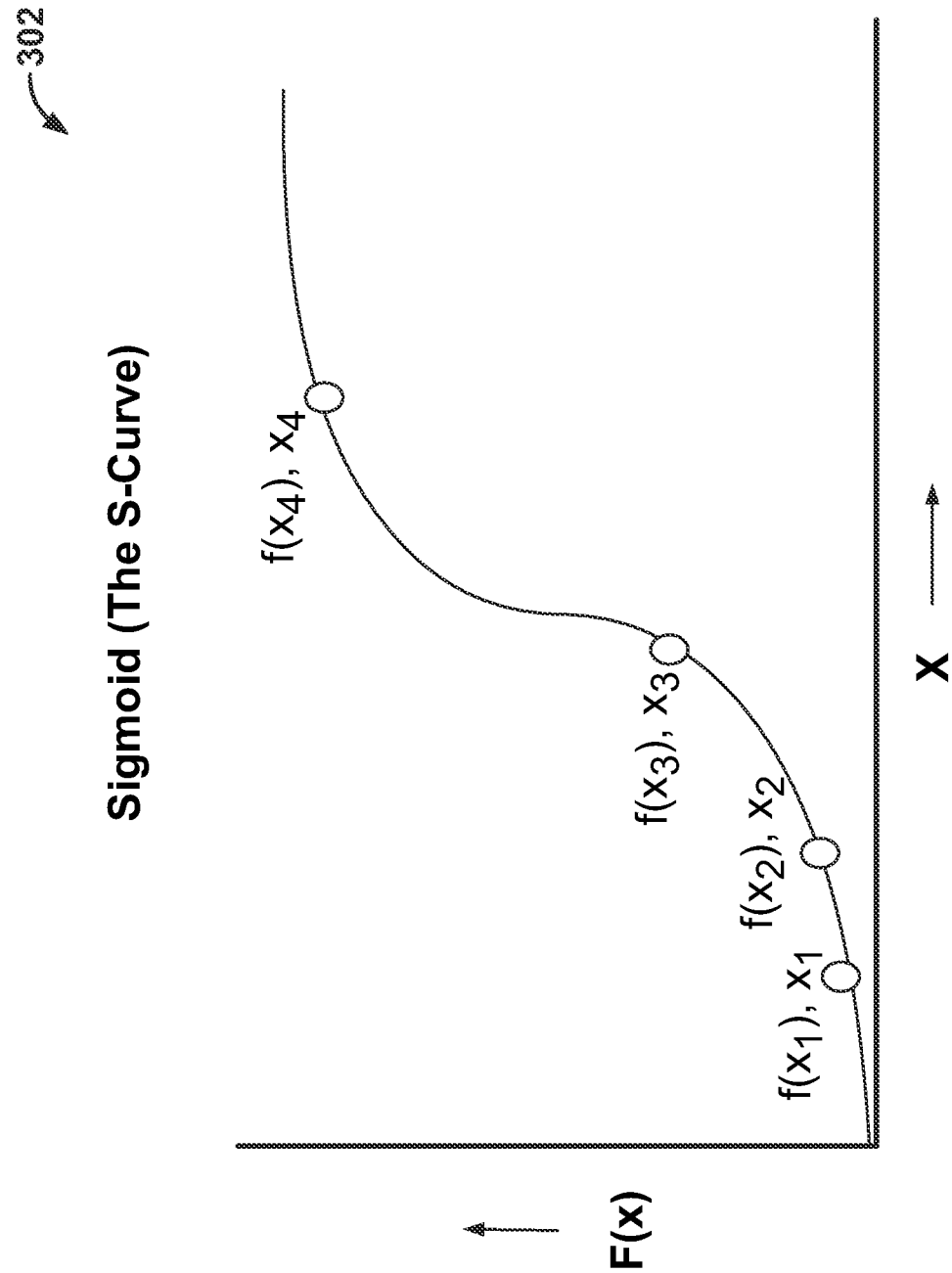
FIG. 3A is an exemplary sigmoid or S-curve of learning, in accordance with some embodiments of the present specification.

In various embodiments, evolution, growth or development of an attribute and therefore the corresponding attribute or skill value may be determined, derived or based on any one of the following approaches or methods of attribute value computation, where different attributes may evolve, grow or develop based on different one of the approaches or methods:

Learning curve—A learning curve is defined as a graphical representation of how an increase in attribute value indicative of an increase in competency, skill or learning (measured on a vertical axis) comes from greater effort or experience (measured on a horizontal axis). In some embodiments, a virtual character's learning curve with respect to an acquired and/or developed attribute may be defined by an S-curve or sigmoid function. A sigmoid function has a characteristic "S"-shaped curve or sigmoid curve 302 as shown in FIG. 3A. In one embodiment, the sigmoid function is defined by the formula:

$$f(x) = \frac{1}{1+e^{-x}}$$

where, f(x) is an attribute value determined on the basis of 'x', while 'x' is one of a plurality of underlying parameters such as, but not limited to, a first parameter corresponding to an amount of time invested in training for an attribute, a second parameter corresponding to an amount of time clocked in playing the game, a third parameter corresponding to a ranking of the player in relation to the game, a fourth parameter corresponding to certain types of wins in the game, a fifth parameter corresponding to a certain number of wins of tournaments at a certain tier, level or league, and a sixth parameter corresponding to a score of the player in relation to the game. In some embodiments, where more than one parameter is used—the values of f(x) may be determined separately based on each parameter and then an average or a weighted average of the values of f(x) may be calculated to determine a final composite attribute value. For example, where three parameters are used a first attribute value $f(x_1)$ may be determined based on the first parameter $x_1$, a second attribute value $f(x_2)$ may be determined based on the second parameter $x_2$ and a third attribute value $f(x_3)$ may be determined based on the third parameter $x_3$. Thereafter, a final composite attribute value may be a simple average or weighted average of the first, second and third attribute values.

As an example, the sigmoid curve 302 may be used to determine values of the 'weapons use' attribute. In one embodiment, 'x' may correspond to an amount of time that the virtual character trains in 'weapons use' in a designated virtual training area. In some embodiments, a state defined by the point $[f(x_1), x_1]$ may correspond to a base value indicative of a 5% damage infliction capability and 10% accuracy. The attribute may evolve (as a result of the training) to another state defined by the point $[f(x_2), x_2]$ indicative of a 7% damage infliction capability and 14% accuracy. The attribute may further evolve to another state defined by the point $[f(x_3), x_3]$ indicative of a 14% damage infliction capability and 30% accuracy. The attribute may further evolve to yet another state defined by the point $[f(x_4), x_4]$ indicative of a 75% damage infliction capability and 85% accuracy. It should be appreciated, that the point $[f(x_1), x_1]$ may be referred to as a first state (which may correspond to a base value of the 'weapons use' attribute, in some embodiments) and the point $[f(x_2), x_2]$ may be referred to as a second state relative to the first state. Similarly, the points $[f(x_2), x_2]$ and $[f(x_3), x_3]$ may be referred to as first and second states, respectively, relative to one another. Similarly, the points $[f(x_3), x_3]$ and $[f(x_4), x_4]$ may be referred to as first and second states, respectively, relative to one another.

The sigmoid curve 302 may be associated with those attributes whose values are characterized by a gradual or slow rate of increase, buildup or improvement, followed by a relatively steep or high rate of increase, buildup or improvement until it hits a maximum after which the rate of increase, buildup or improvement slows down considerably and may even plateau in some embodiments.

In various embodiments, the attribute values may be derived from or based on other forms of the sigmoid curve such as, but not limited to, the following:

Hyperbolic tangent defined by the function:

$$f(x) = \tanh x = \frac{e^x - e^{-x}}{e^x + e^{-x}}$$

Arctangent curve defined by the function:

$$f(x) = \arctan x$$

Gudermannian curve defined by the function:

$$f(x) = gd(x) = \int_0^x \frac{1}{\cosh t} dt = 2 \arctan\left(\tanh\left(\frac{x}{2}\right)\right)$$

Gauss error curve defined by the function:

$$f(x) = \mathrm{erf}(x) = \frac{2}{\sqrt{\pi}} \int_0^x e^{-t^2} dt$$

Smoothstep curve defined by the function:

$$S_n(x) = \begin{cases} 0 & \text{if } x \le 0 \\ x^{n+1} \sum_{k=0}^{n} \binom{n+k}{k}\binom{2n+1}{n-k}(-x)^k & \text{if } 0 \le x \le 1 \\ 1 & \text{if } 1 \le x \end{cases}$$

In some embodiments, a virtual character's learning curve with respect to an acquired and/or developed attribute may be defined by:

Diminishing-returns learning curve or function 304 of FIG. 3B. The curve 304 may be associated with some attributes whose values are characterized by a rate of progression, buildup or improvement that increases rapidly at the beginning and then decreases over time. However, in some embodiments, there may not be a fixed maximum attribute value. In other words, a virtual character is not compartmentalized or constrained in terms of maximization of some attributes. The curve 304 describes a situation where an attribute may be easy to learn, acquire or develop and progression of learning is initially fast and rapid. However, the rate of progression of the attribute value (indicative of learning or progression) is incrementally less over time. In some embodiments, these attributes would still be constrained by how much time a player would need to spend in training, for example, to increase these attributes and other factors like making it harder to incrementally improve these attributes as the skill gets more developed. As an example, it may be easy for a novice to grow or build up an attribute but harder for an expert to do the same or achieve the same incremental growth. As another example, evolving an attribute—such as, but not limited to, speed, accuracy, strength, ability to jump heights—may become progressively more difficult along the diminishing-returns continuum 304. There may not be any limit in terms of a maximum achievable attribute value, but, practically speaking, if a virtual character already has tremendous strength, it may not be worth investing another substantial amount of time in, say, training to increase that strength by just a little.

Increasing-returns learning (or exponential growth) curve or function 306 of FIG. 3C. The curve 306 may be associated with those attributes whose values are characterized by a rate of progression, buildup or improvement that is slow at the beginning and then rises over time with no bounds. In some embodiments, attributes traditionally configured and thought of as immutable might be unconstrained. Non-limiting examples of such attributes comprise height, wingspan, and size of a virtual character.

Complex learning curve or function 308 of FIG. 3D. The curve 308 may be associated with those attributes whose values are characterized by a more complex pattern comprising, for example, of: a first stage 309a wherein a rate of progression or evolution of an attribute is initially slow, a second stage 309b wherein a rate of progression indicates that the virtual character is becoming proficient in the skill, a third stage 309c wherein a rate of progression indicates that the virtual character is plateauing in his proficiency, a fourth stage 309d wherein a rate of progression indicates that the virtual character is actually still improving the skill and a fifth stage 309e wherein a rate of progression indicates that the skill has evolved to a point of becoming automatic, muscle memory for the virtual character.

Figure 3E:
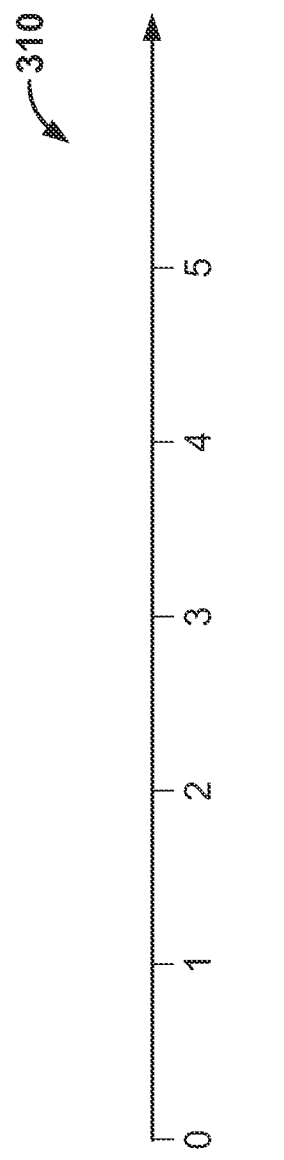
FIG. 3E is an exemplary linear scale, in accordance with some embodiments of the present specification.

Linear progression scale, rule or point system—In some embodiments, an attribute value may be based on a single-dimensional linear progressive scale, rule or point system 310 of FIG. 3E where the attribute value develops, increases or improves linearly or with equal increments from left to right with or without any maximum value. For example, size and strength of a virtual character may increase linearly as the virtual character invests incremental amount of time in a virtual training area configured as a body-building gymnasium. Points 0, 1, 2, 3, 4, and 5 (and even beyond '5' in some embodiments) may be indicative of an amount of time invested in training for the attributes.

Figure 3F:
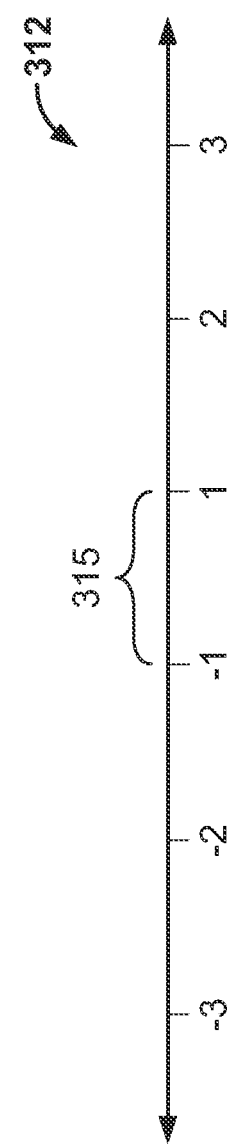
FIG. 3F is an exemplary optimum scale, in accordance with some embodiments of the present specification.

Optimum scale, rule or point system—In some embodiments, an attribute value may be based on a single-dimensional optimum scale, rule or point system 312 of FIG. 3F where an attribute is considered to have been developed to an optimal state when the attribute value lies anywhere within a range 315 on the scale 312. If the attribute value falls below or above the range 315, the attribute is considered to be sub-optimal leading to reduced competence of the virtual character with respect to the attribute or some other attribute. For example, the size attribute of a virtual character may be considered to be optimal in the range 315 since the optimum size may allow the virtual character to develop and/or acquire sufficient degrees of strength and running speed attributes. A size smaller than that in the range 315 may enable the virtual character to develop high running speed but may limit its ability to develop high strength. On the other hand, a size larger than that in the range 315 may enable the virtual character to develop high strength but may limit its ability to develop high speed.

Sphere or span of influence, activity, control, maneuver or impact system—In some embodiments, an attribute value may be indicative or representative of a sphere, area or region of influence, activity, control, maneuver or impact (hereinafter referred to as 'sphere of influence' or SOI) acquired and/or developed by a virtual character. In some embodiments, an improvement, development or growth of the virtual character's attribute may correspond to an increase or expansion of the SOI associated with the attribute.

As a non-limiting illustration, a field of view attribute of a virtual character may be characterized by a sphere or span of influence that may improve as a player progresses (for example, when the player trains for a certain amount of time, wins certain number of tournaments at a certain level or league and/or achieves a certain ranking, score, challenge or objective in gameplay) in a game. For example, initially, a virtual character controlled by a player may have a limited field of view (such as, first-person limited peripheral vision). As the player progresses through training, tournaments and/or gameplay challenges, the field of view of the character improves, such as to a wider first-person peripheral vision. Eventually, the field of view of the character may improve to having a third person view or a wide global view of the field of play. It should be appreciated that an attribute, like the field of view, will have inherent maximums in that the field of view may progress from first-person 45 degrees view to 90 degrees, 180 degrees, 270 degrees, 360 degrees, third-person view to a maximum of over-head or bird's eye view, in some embodiments. The over-head view may, in some embodiments, be constrained in terms of the area of coverage, initially, and may gradually progress to encompass a wider area or region till a global view of the field of play is covered. When a player reaches an inherent maximum of certain attributes, such as field of view, in some embodiments, the field of view of the character may improve in dimensions other than the ones that impose the inherent maximum. For example, if a character has achieved a maximum field of view inherent within the physical dimensions of the virtual world of screen, the character may develop visual capabilities in other dimensions, such as the capability to see through opaque objects or the capability of seeing predicted movements of other characters or objects. In this way, in some embodiments, character attributes can continue to evolve beyond even inherent physical limits in conventional gaming systems.

Figure 7:
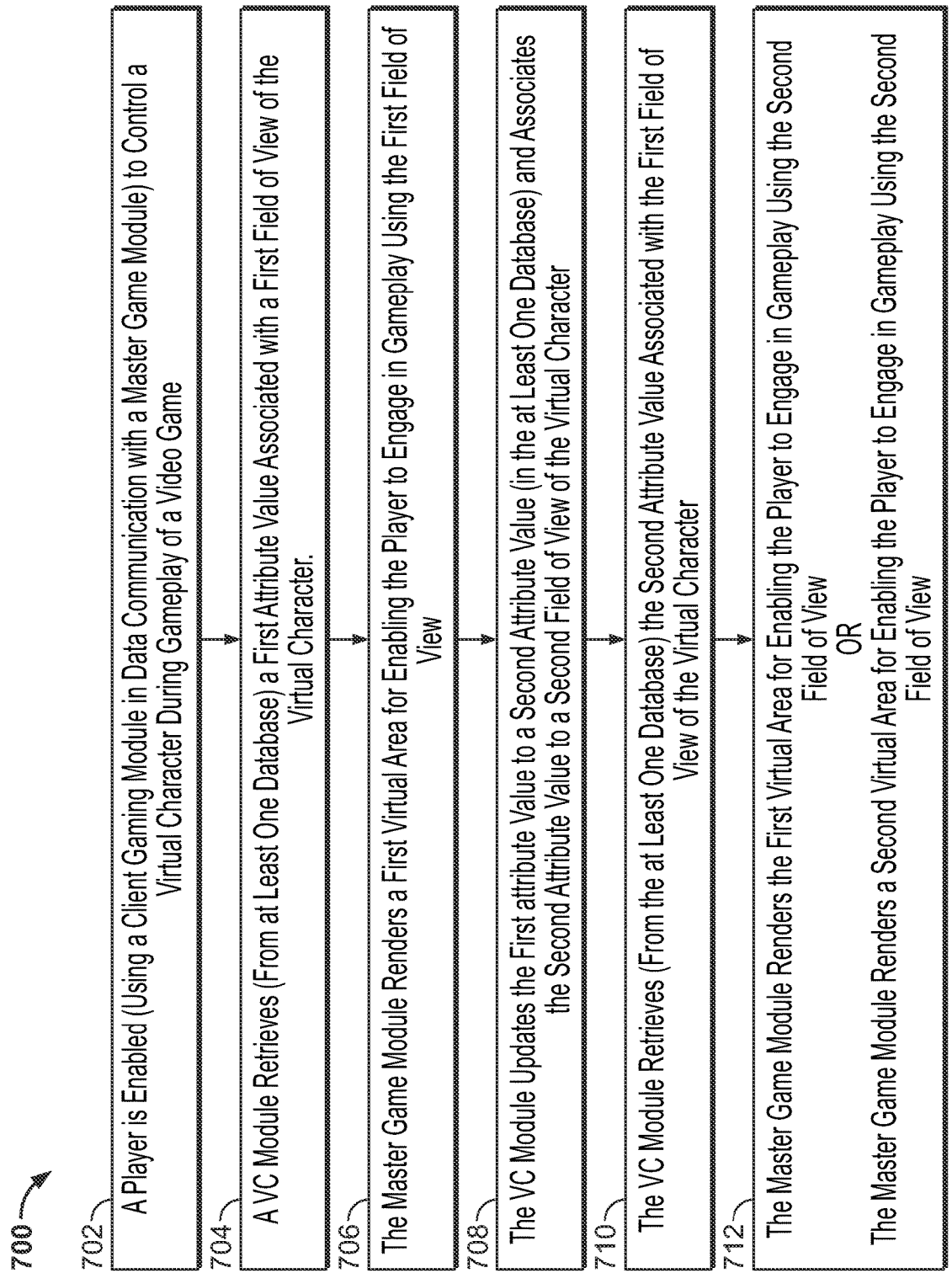
FIG. 7 is a flowchart describing a plurality of exemplary steps of a method of rendering gameplay of a video game based on a player's field of view attribute, in accordance with some embodiments of the present specification.

FIG. 7 is a flowchart describing a plurality of exemplary steps of a method 700 of rendering gameplay of a video game based on a player's field of view attribute, in accordance with some embodiments of the present specification. In embodiments, the player's field of view evolves. In embodiments, the method 700 is implemented by the VC profile module 132. At step 702, a player is enabled (using the client gaming module 130' in data communication with the master game module 130) to control a virtual character during gameplay of the video game. At step 704, the module 132 retrieves (from the at least one database 120) a first attribute value associated with a first field of view of the virtual character. In some embodiments, the first attribute value corresponds to a base value of the field of view attribute.

At step 706, the master game module 130 renders a first virtual area for enabling the player to engage in gameplay using the first field of view. In some embodiments, the first virtual area is an area for conducting gameplay relating to a sporting event. At step 708, the module 132 updates the first attribute value to a second attribute value (in the at least one database 120) and associates the second attribute value to a second field of view of the virtual character. In various embodiments, the first attribute value is updated to the second attribute value in response to at a gameplay event. In some embodiments, the gameplay event is at least one of the player's completion of a training activity, the player's accumulation of a threshold amount of experience or level of competency points, or the player's completion of a gameplay level.

At step 710, the module 132 retrieves (from the at least one database 120) the second attribute value associated with the first field of view of the virtual character. At step 712, in some embodiments, the master game module 130 renders the first virtual area for enabling the player to engage in gameplay using the second field of view. In some embodiments, the second field of view is different from the first field of view but lies within the ambit of an inherent maximum of the field of view attribute. For example, either the first field of view or the second field of view is a first-person field of view; either the first field of view or the second field of view is a third-person field of view; the first field of view is wider than the second field of view or the second field of view is wider than the first field of view. It should be appreciated that, in some embodiments, the first virtual area may correspond to physical dimensions of the virtual world of screen.

In some embodiments, the second field of view is different from the first field of view but breaches the inherent maximum of the field of view attribute. In such embodiments, the master game module 130 renders a second virtual area for enabling the player to engage in gameplay using the second field of view. It should be appreciated that, in some embodiments, the second virtual area may correspond to other dimensions (different from those of the first virtual area) and the second field of view may, therefore, be associated with visual capabilities in the other dimensions, such as the capability to see through opaque objects or the capability of seeing predicted movements of other characters or objects.

As further non-limiting illustrations, accuracy attribute of a shot with a weapon, of a goal converting football kick, or of a scoring basketball throw may be dependent upon a distance of a virtual character from the intended target. For example, initially, the virtual character may have a limited sphere of influence such that the associated accuracy attribute is 100% only up to a distance 'x' from the target. As the player progresses through training, tournaments and/or gameplay challenges, the sphere of influence improves such that the accuracy attribute of the virtual character improves to 100% up to a distance of 'y' from the target and eventually up to a distance 'z' from the target where z>y>x. Thus, the sphere of influence of the virtual character improves as a corollary to the development of the accuracy attribute of the virtual character.

In accordance with aspects of the present specification, the VC profile module 132 is configured to manage inter-relation or interdependencies of various attributes as these are acquired and/or developed. In some embodiments, as certain attributes or traits are evolved, they may affect the ability to evolve one or more other attributes or traits. For example, if a player increases the size of his virtual character, it will be harder to increase the virtual character's speed. On the other hand, if a player seeks to increase the strength of his virtual character it would be hard or almost impossible to increase the strength beyond a level without also increasing the size of his virtual character. Therefore, as a player increases an attribute, it will dial up or dial down the ability to increase at least one other second attribute.

In some embodiments, as certain attributes develop, grow or evolve to certain values or levels, those attributes may combine to open-up or create and assign at least one new, possibly supernatural, or 'grouped attribute' (with a base value, to begin with) to the virtual character. For example, suppose a player has evolved his virtual character's field of view to 360 degrees and evolved his virtual character's speed to being very fast (that is, above a certain threshold), then the virtual character acquires a new attribute or ability to fly short distances. In another example, suppose a player has evolved his virtual character's vertical leap above a threshold and strength above a threshold, then the virtual character acquires the ability to leap on top of a building. In yet another example, suppose a player has evolved his virtual character's strength and height above certain thresholds, then the virtual character may acquire the ability to jump short distances or be able to lift and handle certain special types of heavy weaponry. In still another example, in order for a virtual character to acquire an attribute of horse archery, the virtual character must first acquire and develop the underlying attributes of horse riding and archery. In yet another example, in order for a virtual character to acquire an attribute of espionage, the virtual character must first acquire and develop underlying attributes of stealth and disguise.

In accordance with some aspects of the present specification, a player's virtual character may devolve from one or more base attribute states, may devolve from an evolved or developed state of attributes or may lose one or more acquired attributes. In some embodiments, such downgrading or loss of attributes may occur due to a plurality of reasons such as, but not limited to, neglect or lack of sufficient training of the virtual character and due to the player consciously choosing or selecting certain training regimens/upgrades to develop certain attributes over others. In some embodiments, devolution or loss of attributes may occur, at a predefined pace, with elapsed time to mimic an aging process of the virtual character. In some embodiments, the predefined pace may be completely arrested or reduced by the player through training of the virtual character for the attributes. In some embodiments, all types of attributes-base, evolved or acquired may be subject to the vagaries of the aging process. In some embodiments, certain attributes (for example, ability to cast certain types of magical spells) may be immune to the aging process.

For example, at a first time period, a virtual character may have associated therewith a first attribute having a first value or set of values, a second attribute having a second value or set of values, and/or a third attribute having a third value or set of values. The first value or set of values for the first attribute may be increased by engaging in a first training activity or set of activities. Similarly, the second values or set of values for the second attribute may be increased by engaging in a second training activity or set of activities and the third values or set of values for the third attribute may be increased by engaging in a third training activity or set of activities. Over the course of time, until a second time period, a player may engage in the first training activity or set of activities and decide to not engage in the second training activity or set of activities and the third training activity or set of activities. Accordingly, at the second time period, the first value or set of values of the first attribute may evolve or increase while the second value or set of values of the second attribute may devolve or decrease and the third value or set of values of the third attribute may devolve or decrease. Alternatively, over the course of time, until a second time period, a player may engage in the first training activity or set of activities above a threshold amount (e.g. excessively engage in the first training activity or set of activities) and at the second time period, the first value or set of values of the first attribute may evolve or increase while the second value or set of values of the second attribute may devolve or decrease and the third value or set of values of the third attribute may devolve or decrease, even though the player engages in the second training activity or set of activities and the third training activity or set of activities. Alternatively, over the course of time, until a second time period, a player may engage in at least one of the first training activity or set of activities, the second training activity or set of activities or the third training activity or set of activities and, as time elapses, the rate of increase in at least one of the first value or set of values, the second value or set of values, or the third value or set of values decreases over the time between the first time period and the second time period.

Alternatively, over the course of time, until a second time period, a player may engage in the first training activity or set of activities to increase the first value or set of values at a first rate. During the course of time, a player may start engaging in the second training activity or set of activities to increase the second value or set of values at a second rate. When the player does, the first rate may decrease, even though the player has not changed the time or rate of the first training activity or set of activities. Similarly, during the course of time, a player may start engaging in the third training activity or set of activities to increase the third value or set of values at a third rate. When the player does, both the first rate and the second rate may decrease, even though the player has not changed the time or rate of the first training activity or set of activities or the second training activity or set of activities.

Training Virtual Areas

In accordance with some aspects of the present specification, a player is motivated and enabled to train his virtual character in order to evolve, improve or develop the base attributes, to acquire additional attributes which may not have been part of the virtual character's base attributes and to further evolve, improve or develop the acquired attributes. In embodiments, the training module 134 is configured to generate, monitor and control one or more virtual areas directed towards enabling a player to train and workout his virtual character. In embodiments, the one or more training virtual areas are fully integrated and navigable within the game's virtual world or environment.

The types and characteristics of the one or more training virtual areas would depend upon the game. In some embodiments, the one or more training virtual areas may enable the virtual character to engage in at least one activity directed towards developing one or more existing and/or acquiring one or more additional attributes. As non-limiting examples, there may be a weight training virtual room to develop the attribute of strength, a virtual shooting range to develop attributes related to shooting a firearm, a virtual race track to develop attributes related to driving, a virtual cockpit simulator to develop attributes related to flying a jet or a helicopter, a virtual swimming pool to develop attributes related to swimming, along with other virtual areas directed towards fitness and exercising activities such as, but not limited to, a virtual aerobics room, virtual rooms equipped with virtual treadmills, cardiovascular and resistance exercising equipment to enable the virtual character to stay in shape. For example, if a virtual character intends to lose weight in order to improve upon speed, the virtual character may spend specific amounts of time in fitness and exercising activities to burn a requisite amount of calories and achieve a desired weight.

In some embodiments, the at least one activity of each of the one or more training virtual areas may have one or more associated objectives, targets or goals which when achieved translates into development of one or more attributes related to each of the one or more training virtual areas. In embodiments, the objectives, targets or goals associated with the at least one activity may be related to the amount of time invested (that is, effort) and/or other parameters such as, but not limited to, target weight, calories burnt, threshold number of shooting scores, and threshold driving speed achieved with vehicular accidents below a certain threshold number. It should be appreciated that the objectives, targets or goals associated with each of the one or more training virtual areas would depend on the specific activity related to each of the one or more training virtual areas.

It should be appreciated that playing certain games and performing particular actions within those games may also develop specific attributes of a virtual character. Thus, in some embodiments, the one or more training virtual areas may also be directed towards specific games which when played for specific amounts of time invested and/or played to attain threshold scores, ranks and/or wins enable the virtual character to develop existing and/or acquire additional attributes. For example, playing as a running back in a novice football game may increase specific attributes relating to the running back position—such as, speed and agility.

In embodiments, the player may choose which training virtual areas to enter and therefore which associated activities or games to participate-in or play to evolve his character. However, the evolution of a particular attribute may be constrained by both the player's proficiency at performing the tasks and/or the amount of time the player devotes to the task.

Also, in various embodiments, a player who only focuses on one or a select number of attributes or skills would also need to consider whether neglecting other skills is a good tradeoff. For example, a player participating in body-building workouts of certain training virtual area(s) to increase muscle mass and overall size of his virtual character may need to consider a tradeoff in terms of losing and constraining the ability to jump vertical heights. Ultimately, what tradeoffs and attributes work will get put to the test in competitive play without as much control or influence from developers as in conventional games.

Figure 5:
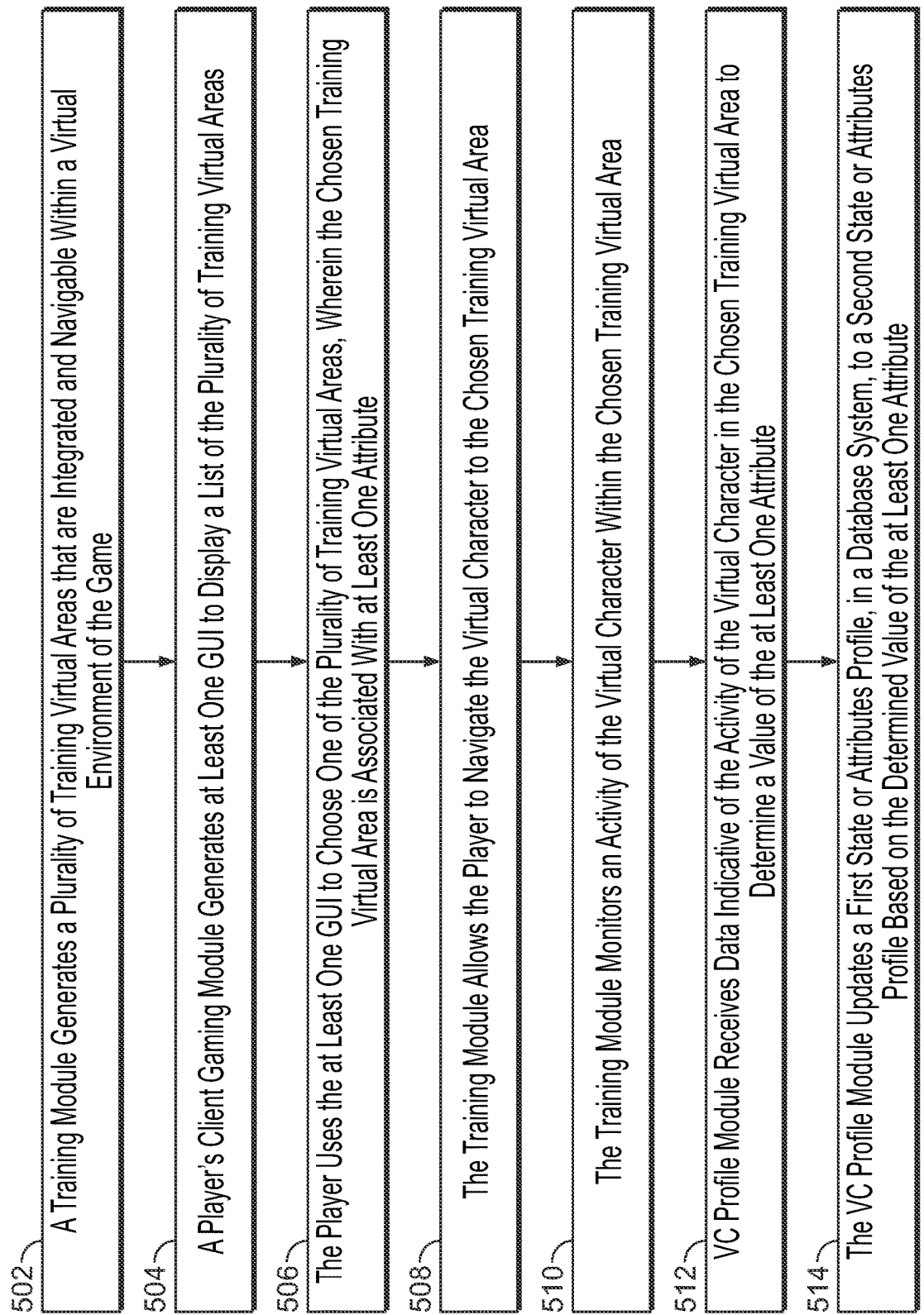
FIG. 5 is a flowchart describing a plurality of exemplary steps of a method of enabling a virtual character of a player to evolve and/or acquire one or more attributes in a multi-player game, in accordance with some embodiments of the present specification.

FIG. 5 is a flowchart of a plurality of exemplary steps of a method of enabling a virtual character of a player to evolve and/or acquire one or more attributes in a multiplayer game, in accordance with some embodiments of the present specification. The virtual character has an associated first state or attributes profile. In some embodiments, the first state or attributes profile comprises one or more base attributes and corresponding base values. In some embodiments, the first state or attributes profile comprises one or more base attributes, wherein at least one of the one or more base attributes has an evolved or progressed value. In some embodiments, the first state or attributes profile comprises at least one acquired attribute (with a corresponding attribute value) in addition to the one or more base attributes.

Referring now to FIGS. 1 and 5, at step 502, the training module 134 generates a plurality of training virtual areas, wherein the plurality of training virtual areas are integrated and navigable within a virtual environment of the game. At step 504, the player's client gaming module 130' generates at least one GUI (Graphical User Interface) to display a list of the plurality of training virtual areas.

At step 506, the player uses the at least one GUI to choose one of the plurality of training virtual areas, wherein the chosen training virtual area is associated with at least one attribute. At step 508, the training module 134 allows the player to navigate the virtual character to the chosen training virtual area. At step 510, the training module 134 monitors an activity of the virtual character within the chosen training virtual area.

At step 512, the VC profile module 132 receives data indicative of the activity of the virtual character in the chosen training virtual area to determine a value of the at least one attribute. In various embodiments, the value of the at least one attribute is determined using one of a learning function, a linear progression scale, an optimum scale or a sphere of influence. In various embodiments, the learning function is one of a sigmoid function, hyperbolic function, arctangent function, Gudermannian function, Gauss error function, smooth step function, diminishing-returns function, increasing-returns function, or complex learning function.

At step 514, the VC profile module 132 updates the first state or attributes profile, in the database 120, to a second state or attributes profile based on the determined value of the at least one attribute. In some embodiments, the determined value is used to update a value of an attribute of the first state or attributes profile and/or add an attribute (with the determined value) to the first state or attributes profile. Thus, the second state or attributes profile comprises an updated value of an attribute of the first state or attributes profile and/or an attribute added to (the existing attributes of the) first state or attributes profile.

eSports Ecosystem

In accordance with some aspects of the present specification, an eSports ecosystem is fully integrated and navigable within the game's virtual world or environment. Accordingly, in embodiments, the eSports module 136 is configured to generate a hierarchical structure comprising of a plurality of tiers or levels of gameplay or tournaments related to the game. The eSports module 136 is also configured to monitor and manage various processes of the eSports ecosystem including generation of individual and team based leaderboards as well as navigation, matches and progression/regression of players/virtual characters through the plurality of tiers or levels.

In some embodiments, the hierarchical structure of the eSports ecosystem has a first tier or level comprising novice, recreational or non-pro leagues, tournaments or matches (hereinafter also referred to as 'recreational leagues'), a second tier or level comprising amateur, semi-professional or minor leagues, tournaments or matches (hereinafter also referred to as 'minor leagues'), and a third tier or level comprising professional (Pro) or major leagues, tournaments or matches (hereinafter also referred to as 'major leagues'). Players/virtual characters begin by participating in recreational leagues and progress through minor leagues to participate in major leagues. In other words, the first tier or level of matches feed into the second tier or level of matches and the second tier or level of matches feed into the third tier or level of matches. Persons of ordinary skill in the art should appreciate that while, in some embodiments, the eSports ecosystem has three tiers or levels, alternate embodiments may have fewer or more than three tiers or levels.

The eSports ecosystem of the present specification generates and supports a tiered competitive league that is characterized by players using unique virtual characters (being unique as a result of their naturally evolved or developed attributes) as opposed to pre-defined virtual characters that exist in conventional eSport competitions. In accordance with some aspects of the present specification, the unique virtual characters themselves become virtual professional athletes in the competitive league in addition to the player controlling the character. In this way, in accordance with certain embodiments, the characters participating in the league continually evolve or new characters emerge so that the eSports competitions do not stagnate.

The eSports ecosystem of the present specification is also characterized by the fact that instead of holding the tiered competitive league as events external to the game's virtual world or environment, as is currently done in conventional eSports leagues, the game's virtual world itself comprises or integrates the various tiers of gameplay.

In various embodiments, eSports module 136 implements at least one of a plurality of eSport league rules based on which a player is allowed to participate and move across the first, second and third tiers or levels. In some embodiments, the plurality of league rules comprises criteria such as, but not limited to:

One or more attributes of the virtual character evolving to exceed predefined threshold attribute values or levels.

The virtual character acquiring a predefined number of attributes with or without a compulsion to have acquired specific attributes deemed to be essential to participate in one of the first, second and/or third tiers or levels.

The virtual character acquiring at least one 'grouped attribute' resulting from a combination of two or more underlying attributes. The at least one supernatural or 'grouped attribute' may or may not be specifically predefined for the first, second and/or third tiers or levels.

The virtual character/player reaching a predefined minimum ranking in one tier or level may qualify the player for matches or tournaments of another tier or level.

The virtual character/player achieving a predefined number or types of wins in one tier or level may qualify the player for matches or tournaments of another tier or level.

In various embodiments, the eSports module 136 is configured to automatically inform a player if he is eligible to participate in matches or tournaments of the first, second and/or third tiers. Alternatively or additionally, a player may click on a virtual icon or button, displayed in his client gaming module 130', to check if he is qualified to participate in matches or tournaments of a tier. In some embodiments, the eSports module 136 is also configured to inform a player of one or more criteria that the player must fulfill to participate in matches or tournaments of the first, second and/or third tiers. The eSports module 136 may inform the player by generating, within the game's virtual world or environment, at least one of a prompt, instant message, or email for communicating to the player's client gaming module 130'.

Virtual Trading Platform

Trading or Swapping of Virtual Characters

In some embodiments, the trading module or engine 138 is configured to allow players to trade or swap evolved virtual characters with one another. Such embodiments provide an incentive and reward system for players to develop characters, further driving engagement in the game. Accordingly, in some embodiments, the trading module 138 is configured to generate a virtual trading platform comprising a virtual marketplace where players can list or post their virtual characters for trading. For example, a player may be interested in creating a fantasy team—let us say, the player may have created and evolved a highly developed quarterback for a football game, but may need to trade other virtual characters to get a running back with certain evolved attributes.

In some embodiments, the virtual marketplace is a virtual area similar to a trading website or is a social networking platform (allowing players to connect with one another) fully integrated, accessible and navigable within the game's virtual world or environment. When initiated by a player, such as by clicking on a virtual icon or button on his client gaming module 130', the trading module 138 may generate at least one GUI to enable the player to provide a plurality of trading data such as, for example, a) indicating that he wishes to offer his virtual character(s) for trading or swapping, and b) indicating the one or more attributes that he is interested in another virtual character(s) to trade with. In some embodiments, when a player enlists his virtual character(s) for trading, the trading module 138 may query the database 120 to extract and include the attributes associated with the enlisted virtual character(s) for the benefit of other players' scrutiny. The trading module 138 may then publish the plurality of trading data on the virtual marketplace embodied as the trading website or may communicate the plurality of trading data to one or more players (that may or may not have been designated by the player for the communication) via the social networking platform. Players may navigate to the virtual marketplace or act upon the communication received through the social networking platform to enter into a trading or swapping transaction. Consequently, the trading module 138 updates the database 120 to reflect the trade or swap and update the virtual characters associated with the player.

In some embodiments, the trading module 138 is configured to analyze the trading data of various players to automatically determine a match. When a match is found, the module 138 may inform the concerned players by generating, within the game's virtual world or environment, at least one of a prompt, instant message, or email for communicating to the player's client gaming module 130'. Subsequently, players may act upon the received communication to accomplish a trade or swap. Consequently, the trading module 138 updates the database 120 to reflect the trade or swap and update the virtual characters associated with the player.

FIG. 6A is a flowchart of a plurality of exemplary steps of a method of enabling a player to trade or swap his virtual character with a virtual character of another player, in accordance with some embodiments of the present specification. Referring now to FIGS. 1 and 6A, at step 602a, the trading module 138 generates a virtual marketplace to enable a player to list or post his virtual characters for trading or swapping. In some embodiments, the virtual marketplace is a virtual area similar to a trading website or is a social networking platform (allowing players to connect with one another) fully integrated, accessible and navigable within the game's virtual world or environment through the player's client gaming module 130'.

At step 604a, the player's client gaming module 130' generates at least one GUI to enable the player to input therein a plurality of trading data related to his virtual character. In some embodiments, the plurality of trading data comprises at least first data indicative of the player's desire to offer the virtual character for trading or swapping and second data indicative of a plurality of attributes that the player desires in a virtual character to trade or swap with. Once submitted, the plurality of trading data is received by the trading module 138 for storing in the database system 120.

At step 606a, the trading module 138 enables the plurality of trading data to be communicated to other players. In some embodiments, the communication is achieved by publishing the plurality of trading data on the trading website. In some embodiments, the communication is achieved by sending a notification to a client gaming module 130' of at least one other player via the social networking platform. In case of the social networking platform, the notification received may include the plurality of trading data. In various embodiments, the notification may include at least one of a prompt, instant message, or email sent to the player's client gaming module 130'.

In some embodiments, at step 608a, another player may navigate to the trading website or act upon the communication received through the social networking platform to enter into a trading or swapping transaction with the player. Additionally or alternatively, in some embodiments, at step 608a', the trading module 138 analyzes the trading data of various players to automatically determine a match between the second data of the player and second data of another player. In some embodiments, when a match is found, the module 138 may inform the concerned players (about the match) by generating, within the game's virtual world or environment, at least one of a prompt, instant message, or email. Subsequently, the players may act upon the received communication to accomplish a trading or swapping transaction.

Finally, at step 610a, the trading module 138 updates the database system 120 to reflect the trading or swapping of the virtual characters between the players.

In-Game Purchase and/or Swapping of Attributes

In some embodiments, the trading module 138 is configured to allow players to conduct in-game purchases and/or swaps directed towards developing and/or acquiring one or more attributes of their virtual characters. In some embodiments, a player may do an outright commercial purchase of a predefined amount of attribute value credits that may be available for sale, at a price, for an attribute from time to time. Accordingly, in some embodiments, the virtual marketplace has a virtual area where one or more attributes and the corresponding attribute values are listed along with price of each of the one or more attributes. In some embodiments, the asking price of an attribute may vary in accordance with the attribute value. That is, an attribute that is more evolved (and has a corresponding higher attribute value) may be available at a higher price compared to the attribute that is less evolved (and has a corresponding lesser attribute value).

In some embodiments, the one or more attributes (with corresponding attribute values) available for sale may be those offered by the trading module 138. Additionally or alternatively, the one or more attributes (with corresponding attribute values) available for sale may be those being offered by players. In some embodiments, the trading module 138 and/or the players may list the attributes for sale in the virtual marketplace embodied as an ecommerce website. Players can navigate to the virtual marketplace, embodied as the ecommerce website, to do in-game purchases of the listed attributes. Additionally or alternatively, the trading module 138 and/or the players may broadcast a notification of the attributes for sale via a social networking platform. Players may act upon the notification received through the social networking platform to enter into a sale-purchase transaction. Consequently, the trading module 138 updates the database 120 to reflect the sale-purchase transaction and update the attributes profile of the players' virtual characters.

In some embodiments, the virtual marketplace has a virtual area where players can list a) one or more attributes being offered for trading or swapping with other players and b) one or more desirable attributes that the players would be inclined to trade or swap for. When initiated by a player, such as by clicking on a virtual icon or button on his client gaming module 130', the trading module 138 may generate at least one GUI to enable the player to provide a plurality of trading data such as, for example, a) indicating that he wishes to offer one or more attributes for trading or swapping, and b) indicating the one or more attributes that he is interested to trade with. The trading module 138 may then publish the plurality of trading data on the virtual marketplace embodied as the ecommerce website or may communicate the plurality of trading data to designated players via the social networking platform. Players may navigate to the ecommerce website or act upon the communication received through the social networking platform to accomplish a trade or swap. Consequently, the trading module 138 updates the database 120 to reflect the trade or swap and update the attributes profile of the player's virtual character.

In some embodiments, the trading module 138 is configured to analyze the trading data of various players to automatically determine a match. When a match is found, the module 138 may inform the concerned players by generating, within the game's virtual world or environment, at least one of a prompt, instant message, or email for communicating to the player's client gaming module 130'. Subsequently, players may act upon the received communication to accomplish a trade or swap. Consequently, the trading module 138 updates the database 120 to reflect the trade or swap and update the attributes profile of the player's virtual character.

In embodiments, the trading module 138 implements at least one of a plurality of trading rules based on which players are allowed to conduct in-game purchases, trades and/or swaps of one or more attributes. In some embodiments, the plurality of trading rules comprises criteria such as, but not limited to:

- The number and frequency of in-game purchases, tradeoffs and/or swaps of attributes being constrained to predefined limits. The number and frequency may vary across the tiers or levels of the game.
- Purchases, tradeoffs and/or swaps of attributes being allowed only after at least one of the existing attribute has been developed or evolved to a predefined attribute value.
- Purchases, tradeoffs and/or swaps of attributes being allowed only after a virtual character has acquired at least one attribute or a predefined number of attributes with or without a compulsion to have acquired from a specified, predefined list of attributes.
- The virtual character acquiring at least one 'grouped attribute' resulting from a combination of two or more underlying attributes. The at least one supernatural or 'grouped attribute' may or may not be specifically predefined.
- The virtual character/player reaching a predefined minimum ranking.
- The virtual character/player achieving a predefined number or types of in-game wins.
- The virtual character/player achieving a predefined score and/or targets.

It should be appreciated that the plurality of trading rules for attributes ensure that players are not motivated or tempted to simply buy their way to achieving developed levels of attributes.

FIG. 6B is a flowchart of a plurality of exemplary steps of a method of enabling a player to conduct in-game sale and/or purchase of one or more attributes of a virtual character associated with the player, in accordance with some embodiments of the present specification. Referring now to FIGS. 1 and 6B, at step 602b, the trading module 138 generates a virtual marketplace wherein the module 138 and/or a player lists or posts a plurality of sales data comprising one or more attributes for sale, corresponding attribute values and asking price for each of the one or more attributes.

In some embodiments, the player's client gaming module 130' generates at least one GUI to enable the player to input therein the plurality of sales data in response to the player clicking a virtual icon or button on his client gaming module 130'. Once submitted, the plurality of sales data is received by the trading module 138 for storing in the database system 120.

In some embodiments, the asking price of an attribute may vary in accordance with the attribute value. That is, an attribute that is more evolved (and has a corresponding higher attribute value) may be available at a higher price compared to the attribute that is less evolved (and has a corresponding lesser attribute value). In some embodiments, the virtual marketplace is a virtual area similar to an ecommerce website or is a social networking platform (allowing players to connect with one another) fully integrated, accessible and navigable within the game's virtual world or environment.

At step 604b, the trading module 138 enables the plurality of sales data to be communicated to other players. In some embodiments, the communication is achieved by publishing the plurality of trading data on the ecommerce website. In some embodiments, the communication is achieved by sending a notification to a client gaming module 130' of at least one other player via the social networking platform. In case of the social networking platform, the notification received may include the plurality of sales data along with a hyperlink to a payment gateway. In various embodiments, the notification may include at least one of a prompt, instant message, or email sent to the player's client gaming module 130'.

At step 606b, another player may navigate to the ecommerce website or act upon the notification received through the social networking platform to enter into a purchase transaction with the player and/or the trading module 138. In various embodiments, the trading module 138 ensures that the purchase transaction is in compliance with one or more of the plurality of trading rules. It should be appreciated that which and how many of the plurality of trading rules will be applicable to the purchase transaction may vary in various embodiments.

Finally, at step 608b, the trading module 138 updates the database system 120 to reflect the sale-purchase transaction between the players. The transaction results in updating of the attributes profiles of the virtual characters of the two players who participated in the transaction.

Figure 6C:
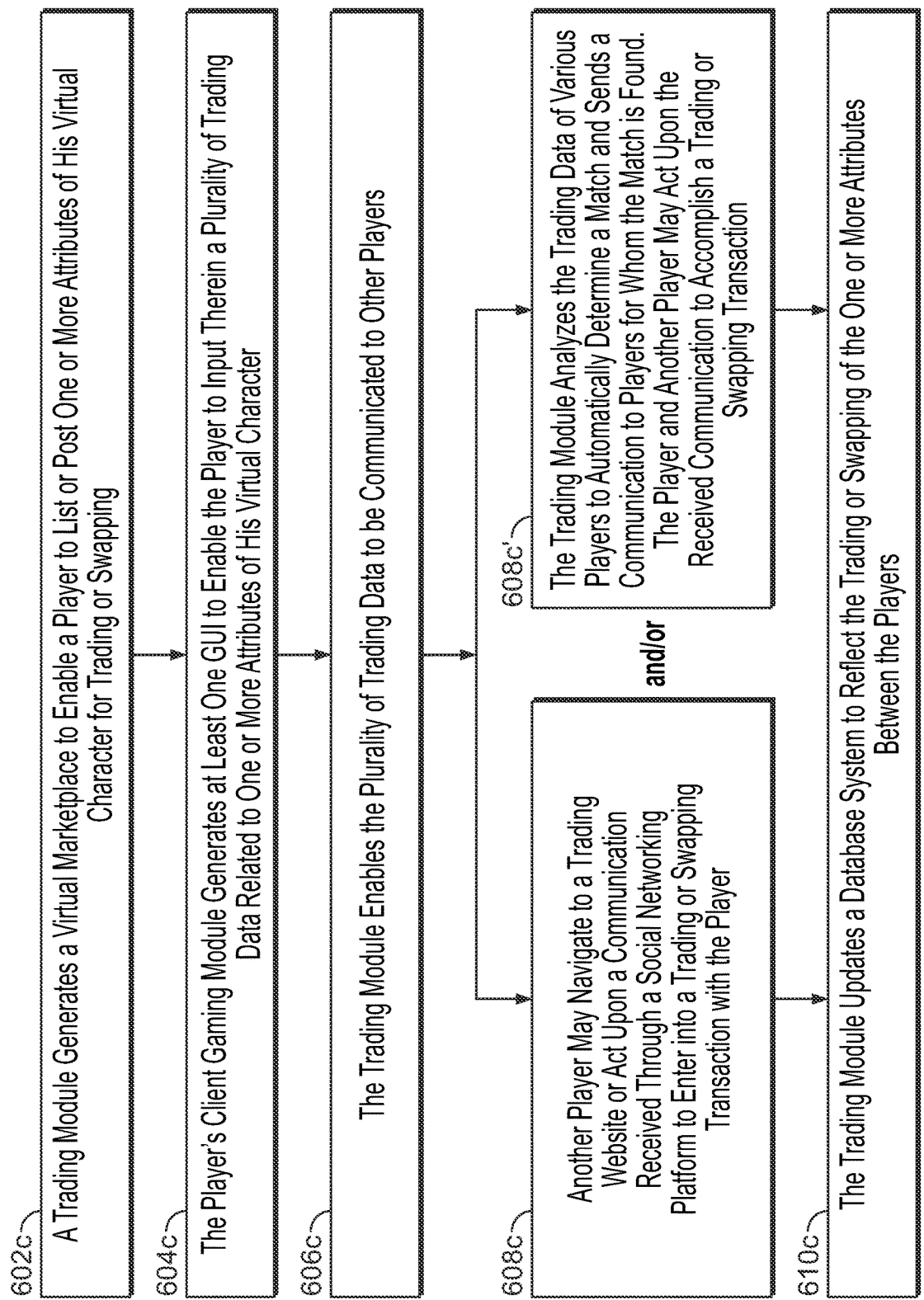
FIG. 6C is a flowchart describing a plurality of exemplary steps of a method of enabling a player to conduct in-game trading or swapping of one or more attributes of a virtual character associated with the player, in accordance with some embodiments of the present specification.

FIG. 6C is a flowchart of a plurality of exemplary steps of a method of enabling a player to conduct in-game trading or swapping of one or more attributes of a virtual character associated with the player, in accordance with some embodiments of the present specification. Referring now to FIGS. 1 and 6C, at step 602c, the trading module 138 generates a virtual marketplace to enable a player to list or post one or more attributes of his virtual character for trading or swapping. In some embodiments, the virtual marketplace is a virtual area similar to a trading website or is a social networking platform (allowing players to connect with one another) fully integrated, accessible and navigable within the game's virtual world or environment through the player's client gaming module 130'.

At step 604c, the player's client gaming module 130' generates at least one GUI to enable the player to input therein a plurality of trading data related to one or more attributes of his virtual character. In some embodiments, the at least one GUI is generated in response to the player clicking a virtual icon or button on his client gaming module 130'. In some embodiments, the plurality of trading data comprises at least first data indicative of the player's desire to offer the one or more attributes for trading or swapping and second data indicative of a plurality of attributes that the player desires to trade or swap with. Once submitted, the plurality of trading data is received by the trading module 138 for storing in the database system 120.

At step 606c, the trading module 138 enables the plurality of trading data to be communicated to other players. In some embodiments, the communication is achieved by publishing the plurality of trading data on the trading website. In some embodiments, the communication is achieved by sending a notification to a client gaming module 130' of at least one other player via the social networking platform. In case of the social networking platform, the notification received may include the plurality of trading data. In various embodiments, the notification may include at least one of a prompt, instant message, or email sent to the player's client gaming module 130'.

In some embodiments, at step 608c, another player may navigate to the trading website or act upon the communication received through the social networking platform to enter into a trading or swapping transaction with the player. Additionally or alternatively, in some embodiments, at step 508c', the trading module 138 analyzes the trading data of various players to automatically determine a match between the second data of the player and second data of another player. In some embodiments, when a match is found, the module 138 may inform the concerned players (about the match) by generating, within the game's virtual world or environment, at least one of a prompt, instant message, or email. Subsequently, the players may act upon the received communication to accomplish a trading or swapping transaction.

In various embodiments, the trading module 138 ensures that the trading or swapping transaction is in compliance with one or more of the plurality of trading rules. It should be appreciated that which and how many of the plurality of trading rules will be applicable to the trading or swapping transaction may vary in various embodiments.

Finally, at step 610c, the trading module 138 updates the database system 120 to reflect the trading or swapping transaction of the one or more attributes between the players. The transaction results in updating of the attributes profiles of the virtual characters of the two players who participated in the transaction.

The above examples are merely illustrative of the many applications of the system of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

I claim:

1. A computer-implemented method of generating a gameplay session of a video game, the method being implemented by a computing device having one or more physical processors programmed with computer program instructions that, when executed by the one or more physical processors, cause the computing device to perform the method, the method comprising:

receiving data from a human player, wherein the data is indicative of how the human player wants to control a virtual character in the video game and wherein the virtual character has two or more desired attributes; and generating a plurality of virtual training areas in the video game, wherein, when the virtual character is subjected to training in a first of the plurality of virtual training areas, one of the two or more desired attributes is improved, wherein, when the virtual character is subjected to training in a second of the plurality virtual training areas, a second of the two or more desired attributes is improved, wherein said improvement in the one of the two or more desired attributes training increases or decreases at least one of the two or more desired attributes using a non-linear function, and wherein improving one of the two or more desired attributes causes a detriment in the second of the two or more desired attributes.

2. The computer-implemented method of claim 1, wherein the non-linear function is at least one of a sigmoidal function, a hyperbolic function, an arctangent function, a Gudermannian function, a Gauss error function, a smooth step function, a diminishing-returns function, an increasing-returns function, or a complex learning function.

3. The computer-implemented method of claim 1, wherein the non-linear function generates a diminishing return with more training.

4. The computer-implemented method of claim 1, wherein improving the second of the two or more desired attributes causes a detriment to the one of the two or more desired attributes.

5. The computer-implemented method of claim 1, wherein the virtual character is determined to be subjected to training based upon at least one of a completion of a training activity, an accumulation of a threshold amount of experience points, or a completion of a gameplay level.

6. The computer-implemented method of claim 1, further comprising rendering the virtual character with said improvement to the one of the two or more desired attributes or said improvement to the second of the two or more desired attributes.

7. The computer-implemented method of claim 1, wherein the two or more desired attributes comprise any two or more of a field of view, an ability to run faster in a quick burst, an ability to dodge incoming attacks, an ability to deflect arrows, an ability to blend or camouflage into a surrounding, an ability to single-handedly use a weapon, an ability to use a weapon with two hands, a weapon specialization skill, a shooting skill, hand-to-hand combat skill, an armor strength to minimize damage intake, a tactical strike capability, a help-on-call ability, a heavy destruction capability, an attack accuracy, an attacking capability, a resistance to magical damage in combat, luck, vigor, vitality, an ability to conduct espionage, and an ability to cast different types of magical spells, brew a potion, or cast fireballs.

8. A system for providing gameplay to players of a video game, comprising:
 a computing device having one or more physical processors programmed with computer program instructions that, when executed by the one or more physical processors, cause the computing device to:
 receive data from a human player, wherein the data is indicative of how the human player wants to control a virtual character in the video game and wherein the virtual character has two or more desired attributes; and
 generate a plurality of virtual training areas in the video game, wherein, when the virtual character is subjected to training in a first of the plurality of virtual training areas, one of the two or more desired attributes is improved, wherein, when the virtual character is subjected to training in a second of the plurality virtual training areas, a second of the two or more desired attributes is improved, wherein said improvement in the one of the two or more desired attributes training increases or decreases at least one of the two or more desired attributes using a non-linear function, and wherein the improvement in the one of the two or more desired attributes causes a detriment in the second of the two or more desired attributes.

9. The system of claim 8, wherein the non-linear function is at least one of a sigmoidal function, a hyperbolic function, an arctangent function, a Gudermannian function, a Gauss error function, a smooth step function, a diminishing-returns function, an increasing-returns function, or a complex learning function.

10. The system of claim 8, wherein the non-linear function generates a diminishing return with more training.

11. The system of claim 8, wherein the improvement in the second of the two or more desired attributes causes a detriment to the one of the two or more desired attributes.

12. The system of claim 8, wherein the computing device is configured to determine the virtual character to be subjected to training based upon at least one of a completion of a training activity, an accumulation of a threshold amount of experience points, or a completion of a gameplay level.

13. The system of claim 8, wherein the computing device is further configured to render the virtual character with said improvement to the one of the two or more desired attributes or said improvement to the second of the two or more desired attributes.

14. The computer-implemented method of claim 8, wherein the two or more desired attributes comprise any two or more of a field of view, an ability to run faster in a quick burst, an ability to dodge incoming attacks, an ability to deflect arrows, an ability to blend or camouflage into a surrounding, an ability to single-handedly use a weapon, an ability to use a weapon with two hands, a weapon specialization skill, a shooting skill, hand-to-hand combat skill, an armor strength to minimize damage intake, a tactical strike capability, a help-on-call ability, a heavy destruction capability, an attack accuracy, an attacking capability, a resistance to magical damage in combat, luck, vigor, vitality, an ability to conduct espionage, and an ability to cast different types of magical spells, brew a potion, or cast fireballs.

15. A computer readable non-transitory medium comprising a plurality of executable programmatic instructions wherein, when said plurality of executable programmatic instructions are executed by a processor in a computing device, a process for providing gameplay to a player of a video game is performed, the plurality of executable programmatic instructions comprising:
 receiving data from a human player, wherein the data is indicative of how the human player wants to control a virtual character in the video game and wherein the virtual character has two or more desired attributes; and
 generating a plurality of virtual training areas in the video game, wherein, when the virtual character is subjected to training in a first of the plurality of virtual training areas, one of the two or more desired attributes is improved, wherein, when the virtual character is subjected to training in a second of the plurality virtual training areas, a second of the two or more desired attributes is improved, wherein said improvement in the one of the two or more desired attributes training increases or decreases at least one of the two or more desired attributes using a non-linear function, and wherein improving one of the two or more attributes causes a detriment in the second of the two or more attributes.

16. The computer readable non-transitory medium of claim 15, wherein the non-linear function is at least one of a sigmoidal function, a hyperbolic function, an arctangent function, a Gudermannian function, a Gauss error function, a smooth step function, a diminishing-returns function, an increasing-returns function, or a complex learning function.

17. The computer readable non-transitory medium of claim 15, wherein the non-linear function generates a diminishing return with more training.

18. The computer readable non-transitory medium of claim 15, wherein improving the second of the two or more desired attributes causes a detriment to the one of the two or more desired attributes.

19. The computer readable non-transitory medium of claim 15, wherein the virtual character is determined to be subjected to training based upon at least one of a completion of a training activity, an accumulation of a threshold amount of experience points, or a completion of a gameplay level.

20. The computer-implemented method of claim 15, wherein the two or more desired attributes comprise any two or more of a field of view, an ability to run faster in a quick burst, an ability to dodge incoming attacks, an ability to deflect arrows, an ability to blend or camouflage into a surrounding, an ability to single-handedly use a weapon, an ability to use a weapon with two hands, a weapon specialization skill, a shooting skill, hand-to-hand combat skill, an armor strength to minimize damage intake, a tactical strike capability, a help-on-call ability, a heavy destruction capability, an attack accuracy, an attacking capability, a resistance to magical damage in combat, luck, vigor, vitality, an ability to conduct espionage, and an ability to cast different types of magical spells, brew a potion, or cast fireballs.

* * * * *